United States Patent
Ho et al.

(10) Patent No.: US 11,087,412 B1
(45) Date of Patent: Aug. 10, 2021

(54) INTELLIGENT COMPENSATION MANAGEMENT

(71) Applicant: Square, Inc., San Francisco, CA (US)

(72) Inventors: Veronica Ho, Oakland, CA (US); Saqi Mehta, San Francisco, CA (US); Matthew Haehl, New York, NY (US); Stephanie Snyder, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 15/476,740

(22) Filed: Mar. 31, 2017

(51) Int. Cl.
*G06Q 40/00* (2012.01)
*G06Q 20/20* (2012.01)

(52) U.S. Cl.
CPC ......... *G06Q 40/125* (2013.12); *G06Q 20/206* (2013.01)

(58) Field of Classification Search
CPC ........................... G06Q 40/125; G06Q 20/206
USPC .......................................................... 705/18
See application file for complete search history.

(56) References Cited

U.S. PATENT DOCUMENTS

| | | | |
|---|---|---|---|
| 5,819,231 A * | 10/1998 | Tremaine | ......... G06Q 10/06375 705/7.21 |
| 5,878,337 A | 3/1999 | Joao et al. | |
| 6,571,218 B1 | 5/2003 | Sadler | |
| 6,873,964 B1 * | 3/2005 | Williams | ....... G06Q 10/063112 705/7.14 |
| 7,209,891 B1 | 4/2007 | Addy et al. | |
| 7,764,185 B1 | 7/2010 | Manz et al. | |
| 7,810,729 B2 | 10/2010 | Morley, Jr. | |
| 7,870,028 B2 | 1/2011 | Kloubakov et al. | |
| 8,001,057 B1 * | 8/2011 | Hill | .................... G06Q 10/1053 705/1.1 |

(Continued)

FOREIGN PATENT DOCUMENTS

| | | |
|---|---|---|
| AU | 2018201228 A1 | 3/2018 |
| EP | 0 993 191 A2 | 4/2000 |

(Continued)

OTHER PUBLICATIONS

Omotayo Adewale Osibanjo et al., Leonardo Journal of Science, Dec. 2014 (Year: 2015).*

(Continued)

*Primary Examiner* — Florian M Zeender
*Assistant Examiner* — Nicole Elena Bruner
(74) *Attorney, Agent, or Firm* — Lee & Hayes, P.C.

(57) ABSTRACT

A service provider may receive job requisition compensation information and/or point of sale (POS) transaction information from a plurality of merchant devices associated with a plurality of merchants. The service provider may categorize the plurality of merchants according to the types of employees employed by the respective merchants, and may further categorize the merchants according to the locations at which they conduct business. The service provider may subsequently determine a compensation recommendation or other compensation information for a particular job requisition offered by a particular merchant. The service provider may further provide instructions to cause a merchant device of the particular merchant to present compensation information within a user interface so as to enable the merchant to view and intelligently adjust compensation for a particular employee.

29 Claims, 11 Drawing Sheets

(56) References Cited

U.S. PATENT DOCUMENTS

| | | | |
|---|---|---|---|
| 8,442,208 B2 | 5/2013 | Shaffer et al. | |
| 8,478,618 B2* | 7/2013 | Coleman | G06Q 10/105 |
| | | | 705/7.11 |
| 8,601,002 B1 | 12/2013 | Ali et al. | |
| 9,064,285 B1 | 6/2015 | Nathoo | |
| 9,727,827 B2 | 8/2017 | Hyder et al. | |
| 9,818,087 B2* | 11/2017 | Cooper | G06Q 10/105 |
| 9,824,323 B1 | 11/2017 | Weiss et al. | |
| 9,882,914 B1 | 1/2018 | Co | |
| 10,515,342 B1 | 12/2019 | Haley | |
| 10,867,291 B1 | 12/2020 | Yien et al. | |
| 2002/0022982 A1* | 2/2002 | Cooperstone | G06Q 10/10 |
| | | | 705/1.1 |
| 2003/0120531 A1* | 6/2003 | Parker | G06Q 10/063112 |
| | | | 705/7.14 |
| 2003/0204447 A1 | 10/2003 | Dalzell et al. | |
| 2005/0192823 A1* | 9/2005 | Kuhn | G06Q 10/0639 |
| | | | 705/7.42 |
| 2006/0047530 A1 | 3/2006 | So et al. | |
| 2006/0138219 A1 | 6/2006 | Brzezniak et al. | |
| 2006/0243798 A1 | 11/2006 | Kundu et al. | |
| 2007/0038503 A1 | 2/2007 | Krajcev et al. | |
| 2007/0039024 A1 | 2/2007 | Krajcev et al. | |
| 2007/0204156 A1 | 8/2007 | Jeghers | |
| 2007/0208572 A1* | 9/2007 | Habichler | G06Q 10/063112 |
| | | | 705/7.14 |
| 2007/0233540 A1 | 10/2007 | Sirota | |
| 2007/0239468 A1* | 10/2007 | O'Brien | G06Q 10/10 |
| | | | 705/30 |
| 2007/0272734 A1 | 11/2007 | Lipton et al. | |
| 2008/0071634 A1* | 3/2008 | Rampell | G06Q 30/08 |
| | | | 705/26.3 |
| 2008/0120129 A1* | 5/2008 | Seubert | G06Q 10/06 |
| | | | 705/35 |
| 2008/0177624 A9 | 7/2008 | Dohse | |
| 2008/0197188 A1 | 8/2008 | Jagatic et al. | |
| 2008/0255929 A1 | 10/2008 | Mouton | |
| 2008/0306750 A1* | 12/2008 | Wunder | G06Q 10/10 |
| | | | 705/1.1 |
| 2009/0005987 A1 | 1/2009 | Vengroff et al. | |
| 2009/0094239 A1* | 4/2009 | Sabol | G06Q 10/10 |
| 2009/0144102 A1* | 6/2009 | Lopez | G06F 21/552 |
| | | | 705/7.11 |
| 2009/0210331 A1* | 8/2009 | Boone | G06Q 10/10 |
| | | | 705/32 |
| 2009/0303040 A1 | 12/2009 | Srinivasa et al. | |
| 2009/0320088 A1 | 12/2009 | Gill et al. | |
| 2010/0211469 A1 | 8/2010 | Salmon et al. | |
| 2010/0269059 A1 | 10/2010 | Olthmer | |
| 2011/0131105 A1 | 6/2011 | Aonuma et al. | |
| 2012/0130774 A1 | 5/2012 | Ziv et al. | |
| 2012/0173570 A1 | 7/2012 | Golden | |
| 2012/0266258 A1 | 10/2012 | Tuchman et al. | |
| 2013/0067547 A1* | 3/2013 | Thavasi | G06F 21/31 |
| | | | 726/7 |
| 2013/0132140 A1 | 5/2013 | Amin et al. | |
| 2013/0132246 A1 | 5/2013 | Amin et al. | |
| 2013/0132274 A1 | 5/2013 | Henderson et al. | |
| 2013/0132887 A1 | 5/2013 | Amin et al. | |
| 2013/0151705 A1 | 6/2013 | Menon et al. | |
| 2013/0159154 A1 | 6/2013 | Purves et al. | |
| 2013/0246207 A1* | 9/2013 | Novak | G06Q 30/0283 |
| | | | 705/26.2 |
| 2013/0246301 A1 | 9/2013 | Radhakrishnan et al. | |
| 2013/0262479 A1 | 10/2013 | Liang et al. | |
| 2013/0301820 A1 | 11/2013 | Williams et al. | |
| 2013/0311836 A1 | 11/2013 | Hurst et al. | |
| 2013/0325734 A1 | 12/2013 | Bixler et al. | |
| 2014/0032382 A1* | 1/2014 | Hamann | G06Q 10/1091 |
| | | | 705/32 |
| 2014/0108113 A1 | 4/2014 | O'Connor et al. | |
| 2014/0114877 A1 | 4/2014 | Montano | |
| 2014/0129135 A1 | 5/2014 | Holden et al. | |
| 2014/0129302 A1 | 5/2014 | Amin et al. | |
| 2014/0129951 A1 | 5/2014 | Amin et al. | |
| 2014/0201001 A1 | 7/2014 | Rellas et al. | |
| 2014/0201100 A1 | 7/2014 | Rellas et al. | |
| 2014/0207500 A1 | 7/2014 | Krajcev et al. | |
| 2014/0258161 A1 | 9/2014 | Brown et al. | |
| 2014/0279102 A1 | 9/2014 | Hartman et al. | |
| 2014/0358803 A1 | 12/2014 | Carter et al. | |
| 2015/0161665 A1 | 6/2015 | Grimes et al. | |
| 2015/0172327 A1 | 6/2015 | Wansley et al. | |
| 2015/0213413 A1 | 7/2015 | Faron et al. | |
| 2015/0242922 A1 | 8/2015 | Zamer | |
| 2015/0269508 A1 | 9/2015 | Damboritz et al. | |
| 2015/0332242 A1 | 11/2015 | Perry et al. | |
| 2016/0055322 A1 | 2/2016 | Thomas | |
| 2016/0071038 A1* | 3/2016 | Puttaswamy | G06Q 10/06312 |
| | | | 705/7.22 |
| 2016/0071121 A1 | 3/2016 | Gestetner et al. | |
| 2016/0171516 A1 | 6/2016 | Brosnan et al. | |
| 2016/0217470 A1 | 7/2016 | Gerard et al. | |
| 2016/0224205 A1* | 8/2016 | Fulton | G06F 3/04817 |
| 2016/0239806 A1 | 8/2016 | Benham et al. | |
| 2016/0328715 A1* | 11/2016 | Gideoni | G06Q 30/06 |
| 2016/0379202 A1 | 12/2016 | Turner | |
| 2017/0093952 A1 | 3/2017 | Kumar et al. | |
| 2017/0279903 A1 | 9/2017 | Mimassi | |
| 2017/0316382 A1* | 11/2017 | Colner | G06Q 40/06 |
| 2018/0122028 A1 | 5/2018 | Pattekar et al. | |
| 2018/0260768 A1 | 9/2018 | Ng et al. | |
| 2019/0258818 A1 | 8/2019 | Yu et al. | |
| 2021/0035055 A1 | 2/2021 | Ng et al. | |

FOREIGN PATENT DOCUMENTS

| | | |
|---|---|---|
| WO | 02/44981 A1 | 6/2002 |
| WO | 2016/011287 A1 | 1/2016 |
| WO | 2018/164839 A1 | 9/2018 |

OTHER PUBLICATIONS

"Card Not Present Transaction," Wikipedia, published Mar. 4, 2014, Retrieved from the Internet URL: http://en.wikipedia.org/wiki/Card_not_present_transaction, on Jun. 6, 2014, pp. 1-2.

Goode, L., "Paying With Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.

Munson, J., and Gupta, V.K., "Location-Based Notification as a General-Purpose Service," dated Sep. 28, 2002, Retrieved from the Internet URL-https://ai2-s2-pdfs.s3.amazonaws.com/1bb5/6ae0a70b030e2f2376ed246834bddcabd27b.pdf, pp. 40-44.

Myres, L., "The Mac Security Blog: What is Multi-Factor Authentication, and How Will it Change in the Future?," Intego, dated Aug. 17, 2012, Retrieved from the Internet URL: http://www.intego.com/mac-security-blog/what-is-multi-factor-authentication-and-how-will-it-change-in-the-future/, on Nov. 11, 2014, pp. 1-4.

"Online Shopping," dated Nov. 2, 2014, Retrieved from the Internet URL: http://en.wikipedia.org/wiki/Online_shopping, on Nov. 10, 2014, pp. 1-12.

"Payment Gateway," Wikipedia, published May 30, 2014, Retrieved from the Internet URL: http://en.wikipedia.org/wiki/Payment gateways, on Jun. 6, 2014, pp. 1-3.

"Uber—Android Apps on Google Play," Published on Nov. 10, 2014, Retrieved from the Internet URL: https://play.google.com/store/apps/details?id=com.ubercab&hl=en, on Nov. 12, 2014, pp. 1-2.

Wallen, J., "Five Top Apps for Managing Inventory," Tech Republic, dated Aug. 15, 2012, Retrieved from the Internet URL: http://www.techrepublic.com/blog/five-apps/five-top-apps-for-managing-inventory/, on Nov. 10, 2014, pp. 1-7.

Non-Final Office Action dated Oct. 28, 2014, for U.S. Appl. No. 14/334,422, of Nathoo, A., filed Jul. 17, 2014.

Notice of Allowance dated Feb. 18, 2015, for U.S. Appl. No. 14/334,422, of Nathoo, A., filed Jul. 17, 2014.

Non-Final Office Action dated Mar. 2, 2015, for U.S. Appl. No. 14/177,177, of Brock, Z., et al., filed Feb. 10, 2014.

(56) References Cited

OTHER PUBLICATIONS

Final Office Action dated Oct. 19, 2015, for U.S. Appl. No. 14/177,177, of Brock, Z., et al., filed Feb. 10, 2014.
First Examination Report for Australian Patent Application No. 2015289554, dated Feb. 21, 2017.
Examiner Requisition for Canadian Patent Application No. 2,955,452, dated Dec. 29, 2017.
Second Examination Report for Australian Patent Application No. 2015289554, dated Feb. 8, 2018.
Non-Final Office Action dated Feb. 28, 2018, for U.S. Appl. No. 14/754,909, of Tsou, V., filed Jun. 30, 2015.
Final Office Action dated Jul. 16, 2018, for U.S. Appl. No. 14/754,909, of Tsou, V., filed Jun. 30, 2015.
Examiner Requisition for Canadian Patent Application No. 2,955,452, dated Oct. 23, 2018.
International Search Report and Written Opinion for International Application No. PCT/US2015/040800, dated Oct. 30, 2015.
International Search Report and Written Opinion for International Application No. PCT/US2018/018950, dated Apr. 12, 2018.
Non-Final Office Action dated Jan. 10, 2019, for U.S. Appl. No. 15/630,769 of Haley, E., filed Jun. 22, 2017.
First Examination Report for Australian Patent Application No. 2018201228, dated Feb. 26, 2019.
Non-Final Office Action dated May 30, 2019, for U.S. Appl. No. 14/754,909, of Tsou, V., filed Jun. 30, 2015.
Non-Final Office Action dated Jun. 14, 2019, for U.S. Appl. No. 15/454,892, of Ng, C., et al., filed Mar. 9, 2017.
Second Examination Report for Australian Patent Application No. 2018201228, dated Jul. 15, 2019.
Notice of Allowance dated Aug. 2, 2019, for U.S. Appl. No. 15/630,769, of Haley, E., filed Jun. 22, 2017.
Non-Final Office Action dated Aug. 9, 2019, for U.S. Appl. No. 16/203,545, of Yien, K., et al., filed Nov. 28, 2018.
Final Office Action dated Oct. 17, 2019, for U.S. Appl. No. 14/754,909, of Tsou, V., filed Jun. 30, 2015.
Non-Final Office Action dated Nov. 15, 2019, for U.S. Appl. No. 15/390,119, of Ho, V., et al., filed Dec. 23, 2016.
Non-Final Office Action dated Dec. 2, 2019, for U.S. Appl. No. 15/454,892, of Ng, C., et al., filed Mar. 9, 2017.
Final Office Action dated Dec. 13, 2019, for U.S. Appl. No. 16/203,545, of Yien, K., et al., filed Nov. 28, 2017.
Examiner Requisition for Canadian Patent Application No. 2,955,452, dated Oct. 7, 2019.
Advisory Action dated Aug. 10, 2020, for U.S. Appl. No. 15/390,119, of Ho, V., et al., filed Dec. 23, 2016.
Notice of Grant for Australian Patent Application No. 2018201228 dated Jun. 18, 2020.
Advisory Action dated Dec. 19, 2019, for U.S. Appl. No. 14/754,909, of Tsou, V., filed Jun. 30, 2015.
Notice of Acceptance for Australian Patent Application No. 2018201228 dated Feb. 21, 2020.
Non-Final Office Action dated May 18, 2020, for U.S. Appl. No. 16/203,545, of Yien, K., et al., filed Nov. 28, 2018.
Final Office Action dated Jun. 1, 2020, for U.S. Appl. No. 15/390,119, of Ho, V., et al., filed Dec. 23, 2016.
Notice of Allowance dated Jun. 10, 2020, for U.S. Appl. No. 15/454,892, of Ng, C., et al., filed Mar. 9, 2017.
Notice of Allowance dated Sep. 22, 2020, for U.S. Appl. No. 16/203,545, of Yien, K., et al., filed Nov. 28, 2018.
Non-Final Office Action dated Apr. 1, 2021, for U.S. Appl. No. 15/390,119, of Ho, V., et al., filed Dec. 23, 2016.

* cited by examiner

… … …

INTELLIGENT COMPENSATION MANAGEMENT

BACKGROUND

Managers are constantly trying to retain a talented pool of employees while staying within given resource requirements, such as salary and stock budgets. Today managers and human resource leaders have limited information available for recruiting talented individuals, fairly reviewing employee performance, assessing the risk of individuals leaving the organization and identifying those individuals most likely to leave, fairly awarding salary increases and stock incentives based upon employee performance, and accurately comparing compensation received by the employees with meaningful benchmarks.

Managers are often provided with different reports regarding employees' salaries, stock options, and other rewards. Managers are challenged, however, when comparing employees to benchmark averages or simply other employees in the same organization or territory.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1A:
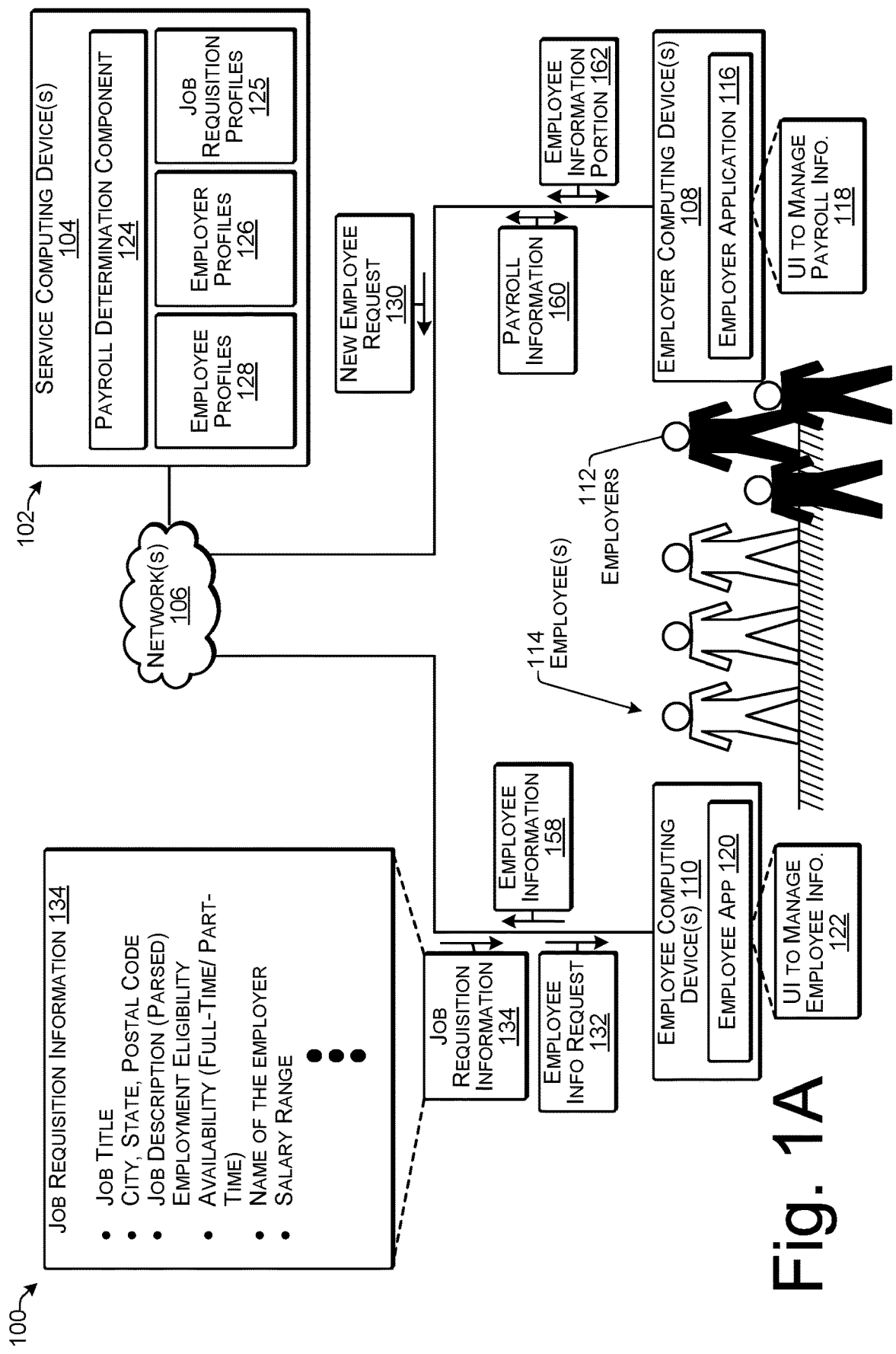
FIG. 1A illustrates an example environment for a payroll service that generates compensation recommendations in any employer-employee scenario, according to some implementations.

Some implementations herein include techniques and arrangements for adding employee information to an employer's payroll in a seamless automated fashion and recommending compensation in accordance with industry benchmarks and/or trends in a certain geographical area, industry, role of the employee, or other employer set preferences. As one example, before an employer hires a new employee, the employer may send a request to a service provider to request that the new employee job be added to the database of job requisitions of the employer. In response, the service provider may send an electronic communication to the employer, such as an email, SMS (short message service) text message, or the like, to provide a selection of candidates both internal and external along with recommendation of compensation that the employer may pay to stay current with industry or competition trends. Such implementations may also be extended to cases where the employer wishes to review the compensation of an existing employee to retain talented employees. Some implementations described herein include techniques and arrangements for providing compensation information to a merchant based, at least in part, on job requisition compensation information and/or transaction information received from a plurality of merchant devices associated with a plurality of other merchants. For example, a service provider may provide a payment service to the plurality of merchants to enable transactions between the buyers and employees at point of sale (POS) locations. As used herein, a transaction may include a financial transaction for the acquisition of goods and/or services (referred to herein as items) that is conducted between an employee (e.g., a customer) and a buyer, such as at a POS location owned by a merchant. Thus, the service provider may receive transaction information for a large number of POS transactions between buyers and employees at a plurality of POS locations for a variety of items. Further, in some examples, the service provider may receive job requisition compensation information directly from a plurality of merchants associated with the payment service. The service provider may analyze the received transaction information and/or the received job requisition compensation information for determining personalized compensation information for a particular merchant and employees employed by merchant, such as for assisting the merchant in determining compensation for one or more employees offered by the particular merchant.

In some examples, the service provider may send personalized compensation information to a merchant device associated with a particular merchant for a particular job requisition (or job position) that is open or fulfilled or in process of getting completed. For instance, the compensation information may recommend a compensation or a range of compensation for a job requisition offered by the merchant, or for a job requisition that the merchant is considering offering. In some cases, the compensation information may be determined based at least in part on transaction information from the plurality of transactions and/or based at least in part on the job requisition compensation information received from the plurality of merchants. For example, the compensation information provided to the merchant may indicate to the merchant the compensation that other merchants in the same geographic region are charging for a particular job requisition. Thus, the compensation information may provide a range of compensation, such as from low compensation to high compensation, the median compensation, the average compensation, or the like. The compensation information provided by the service provider may further include a recommended compensation for the particular merchant that is based on information about the particular merchant. For example, the particular merchant may have expressed a desire to sell to a particular type of customer, may have specified a profit margin desired for each job requisition sold, may have specified a certain number of units to be sold over a certain period of time, and so forth.

As another example, the service provider may determine compensation sensitivity of the employees that are more active at a particular merchant. For example, the service provider may determine that, for a particular merchant, if the merchant were to increase the compensation of a particular role by, e.g., 10%, and the price of the item is increased slightly, the compensation can be made at par with industry benchmarks. In some instances, this information may be determined from the employee profiles of the employees that have operated a plurality of transactions at the particular merchant in the past. For instance, the employee profiles may indicate that the employees have tended to continue to operate like similar employees despite compensation decreases in the past, either at the particular merchant, or at other similar merchants in the geographic region, or alternatively, regularly work the same hours at a comparable position for higher compensation at other merchants.

In some instances, a merchant can interact with a POS computing device, or other merchant device, to sign up for the payment service and the compensation information service. In addition, to a certain extent, a merchant may be able to specify a type of employee the merchant would like to offer a job to, or a type of business model under which the merchant would like to operate. For example, at one end the scale, the merchant may wish to cater to a smaller number of high-end customers and charge higher compensation for more personalized service or, at the other end of the scale, the merchant may wish to offer to a larger volume of customers for lower compensation, and not spend as much time serving each customer. For instance, some merchants may desire to serve a smaller number of customers to provide a higher quality of service to each customer, while charging an associated higher compensation per customer, e.g., so that the merchant has time to work with each customer individually. On the other hand, other merchants may desire to rely on a high volume of sales with a lower profit margin per sale, and may not care to devote a large amount of time to each customer. Accordingly, the compensation analysis and information service may provide each merchant with particular ranges for compensation of certain employees to attain either of these business models, or various business models between these two business models. Thus, implementations herein may assist a merchant in managing, at least in part, the type of business that the merchant will operate.

Furthermore, in some examples, the service provider may determine that the customer base of a particular merchant has changed over time and, in response, may recommend that the particular merchant adjust the compensation charged for one or more employees based on the change in the customer base of the particular merchant. In other words, in order to maintain the customer base that the merchant currently has, the service provider may recommend that the merchant adjust the compensation of particular employees either up or down, depending on how the customer base of the merchant has changed. As another example, as new customers become regular customers, the service provider may detect this based on the frequency with which particular employees visit the particular merchant. In response, the service provider may recommend that the merchant begin adjusting compensation of particular employees upward based on the changes in behavior of the customer base, the regularity with which the particular employees conduct purchases, and so forth.

Further, in some examples, the merchant may inform the service provider that the merchant desires to have a relatively fixed profit margin. Thus, the service provider may recommend that the merchant adjust the compensation of one or more employees up or down to maintain the fixed margin for the particular employees. As another example, the merchant may provide financial data to the service provider, such as overhead costs, inventory costs, cost per job requisition, desired margin, and so forth, to enable the service provider to take the financial data into consideration when determining compensation for the particular merchant, such as for maintaining overall profitability, particular profit margins, and so forth.

In some examples, the compensation information may be provided to a particular merchant when the particular merchant is first starting a business, such as to enable the merchant to determine compensation for the employees that the merchant will offer, and to enable the merchant to compensate the employees appropriately for the customer base desired by the merchant.

A merchant application on the merchant device may provide a user interface to enable the merchant to select or otherwise specify a compensation for a particular job requisition. For example, the user interface may provide a graphic element that indicates a lower compensation range and an upper compensation range and may indicate a recommended compensation or recommended compensation range for the particular job requisition based on a number of factors. Such factors may include how the merchant is currently compensation other employees offered by the merchant, how other merchants in the same geographic region compensation the particular job requisition, how much employees who frequent the merchant and similar merchants usually pay for the job requisition, and so forth. As one example, if the merchant currently compensates most of his or her other employees in a premium compensation range, then the recommended compensation for the particular merchant for a new job requisition may be in a premium compensation range as well, as the merchant's compensation policy implies a business model of building a premium brand with premium compensation. In some cases, the user interface may enable the merchant to interact with the compensation information, such as by providing a sliding scale, a virtual dial, or other virtual control, to enable the merchant to view predictions as to the effect of different compensation on the expected number of units that will be sold by the merchant at a selected compensation along the scale. Further, the compensation for different types of employees offered by the merchant may be compared to determine if the merchant's compensation is consistent across the different types of employees for the type of business model under which that the merchant is operating.

As mentioned above, in some cases, transaction information from the merchant and/or from other merchants may be used to determine compensation information. The merchant device may present the received compensation information on a display associated with the merchant device to enable the particular merchant to select a compensation for the corresponding job requisition. For instance, the compensation information may be presented on the merchant device by a merchant application. Further, the merchant may be able to interact with the presented compensation information to select additional or alternative compensation for the job requisition, and the merchant application may present, e.g., alternative sales projections at the alternative compensation. In some cases, the merchant application may provide a user interface including a virtual control to enable the merchant to select different possible compensation. When the merchant has decided on a compensation, the merchant may use the user interface to set the selected compensation. The selected compensation may be automatically applied to a payment service component of the merchant application, and/or may be propagated to additional merchant devices associated with the merchant.

Furthermore, the compensation information may be periodically updated by the service provider based on newly received transaction information and/or newly received merchant job requisition compensation information. For example, the service provider may continually receive job requisition compensation information and transaction information from a plurality of merchants, including the particular merchant, and may organize this information into merchant profiles and/or employee profiles. For example, a single employee profile may include transaction information for a plurality transactions conducted by the corresponding employee with various different merchants. The transaction information from a plurality of employee profiles can be aggregated and analyzed to determine characteristics of employees that are customers or potential customers of a particular merchant, and to determine the compensation paid for particular employees by particular employees or categories of employees. Furthermore, the job requisition compensation information of a plurality of merchants and the transaction histories of the plurality of merchants may be organized into respective merchant profiles corresponding to respective merchants. The service provider may provide compensation recommendations that are targeted or otherwise personalized for a particular merchant based on an analysis of the transaction information in the employee profiles and/or the merchant profiles.

For discussion purposes, some example implementations are described in the environment of a service computing device that makes compensation recommendations to a merchant based on analysis of transaction information and/or merchant job requisition compensation information. However, implementations herein are not limited to the particular examples provided, and may be extended to other environments, other system architectures, and so forth, as will be apparent to those of skill in the art in light of the disclosure herein.

In response to receiving the communication from the service provider, the employee may fill in a plurality fields in a user interface (UI), or may otherwise provide the requested employee information to the service provider. The employee information may be sent to the service provider and the service provider may associate the received employee information with an employee profile corresponding to the new employee. Furthermore, the employee may provide an authorization credential or other authorization information so that access to the employee information in the employee profile may be controlled by the employee. Accordingly, the employee may be able to add to, update, or otherwise change the employee information as desired by accessing the employee profile maintained by the service provider. Any changes subsequently made by the employee may be applied by the service provider to the current payroll information for the current employer's payroll.

In some examples, at least a portion of the employee information may be sent to the employer for verification and/or signature, such as by the employer and/or the employee. For instance, certain government-required forms, such as an IRS W-4 form for employee tax withholding exemptions, and/or a USCIS (United States Customs and Immigration Service) Form 1-9 for employee eligibility verification may be provided to the employer in a pre-filled condition, and may just require signature and verification. In other examples, the employer may receive an indication from the service provider that the employee information for the new employee has been received, and the new employee has been added to the employer's payroll.

The employer may further provide payroll information to the service provider, which may include wage information regarding how much the new employee is to be paid (e.g., hourly or salary), how often the new employee will be paid, whether the new employee is eligible for commission or overtime, rules for distributing gratuities, if any, and so forth.

In some examples, when adding a new employee to the payroll, the employer merely sends some basic identifying information, such as name and email address or phone number, to the service provider to enable addition of the new employee to the employer's payroll. The employee may subsequently provide the employee information to the service provider to enable the service provider to add the employee to the payroll. The employee may have full access and control over the employee's own information. The employee can fill in the requested information and may change the information when desired. Further, when the employee takes a new job, an additional job, etc., the employee may use the employee information already provided for the previous job. Thus, the employee does not have to re-enter any employee information unless that information has changed. Additionally, the employer does not have to maintain forms about the employee, maintain information about the employee, or the like. Instead, the service provider maintains the employee's information and enables the employee to manage this information directly, which frees up the employers to run their businesses without being responsible for managing payroll information for each employee.

In some examples, the employer may be a merchant, and the service provider may also provide a payment service to the merchant/employer, and may provide the payroll service in association with providing the payment service. The payment service provided by the service provider may include the provision of software, hardware and/or payment processing services to the merchant to enable the merchant to receive payments from buyers and to otherwise conduct POS transactions with buyers.

Further, the data from the payment service may be used to determine payroll payments for particular employees of the merchant. For example, the payment service may keep track of hours worked by an employee, sales made by an employee, gratuities received by an employee, and so forth. Accordingly, the payroll service may directly receive the information from the payment service to calculate the payroll payment due to particular employees. For example, the payroll service may use the data from the payment service to determine whether the employee is due a sales commission based on the amount of sales made while the employee is logged in to, or otherwise determined to be using a particular merchant device on which identified sales were generated. Further, gratuities may be tracked and distributed according to one or more tip distribution rules provided by the merchant.

Examples of the proposed intelligent payroll system offer many technical improvements over prior solutions. For instance, some example implementations enable dynamic adjustment and recommendation of an employee compensation based on variety of signals so as to provide a more accurate valuation of an employees contribution to the merchant's business. Moreover, employee compensation intelligence is provided in an automated manner on a user interface associated with the merchant using digitally-acquired geographical and contextual information associated with one or more merchant device(s). The signals may include chargebacks, upsell, check out performance per day/week, activity across similar merchants (MCC, location) associated with the payment service to make wage recommendations. The payment service may also be used to generate employee rating and benchmarking for a set of merchants or employees at a merchant location. The trigger may be several including merchant initiated, employee initiated or even service initiated. For example, the payment service may time the compensation review based on when attrition may occur with a high performing employee as per current trends.

For discussion purposes, some example implementations are described in the environment of a service computing device that communicates with an employer computing device and an employee computing device to manage employee information. However, implementations herein are not limited to the particular examples provided, and may be extended to other environments, other system architectures with more or fewer computing devices, other applications, and so forth, as will be apparent to those of skill in the art in light of the disclosure herein.

Figure 1B:
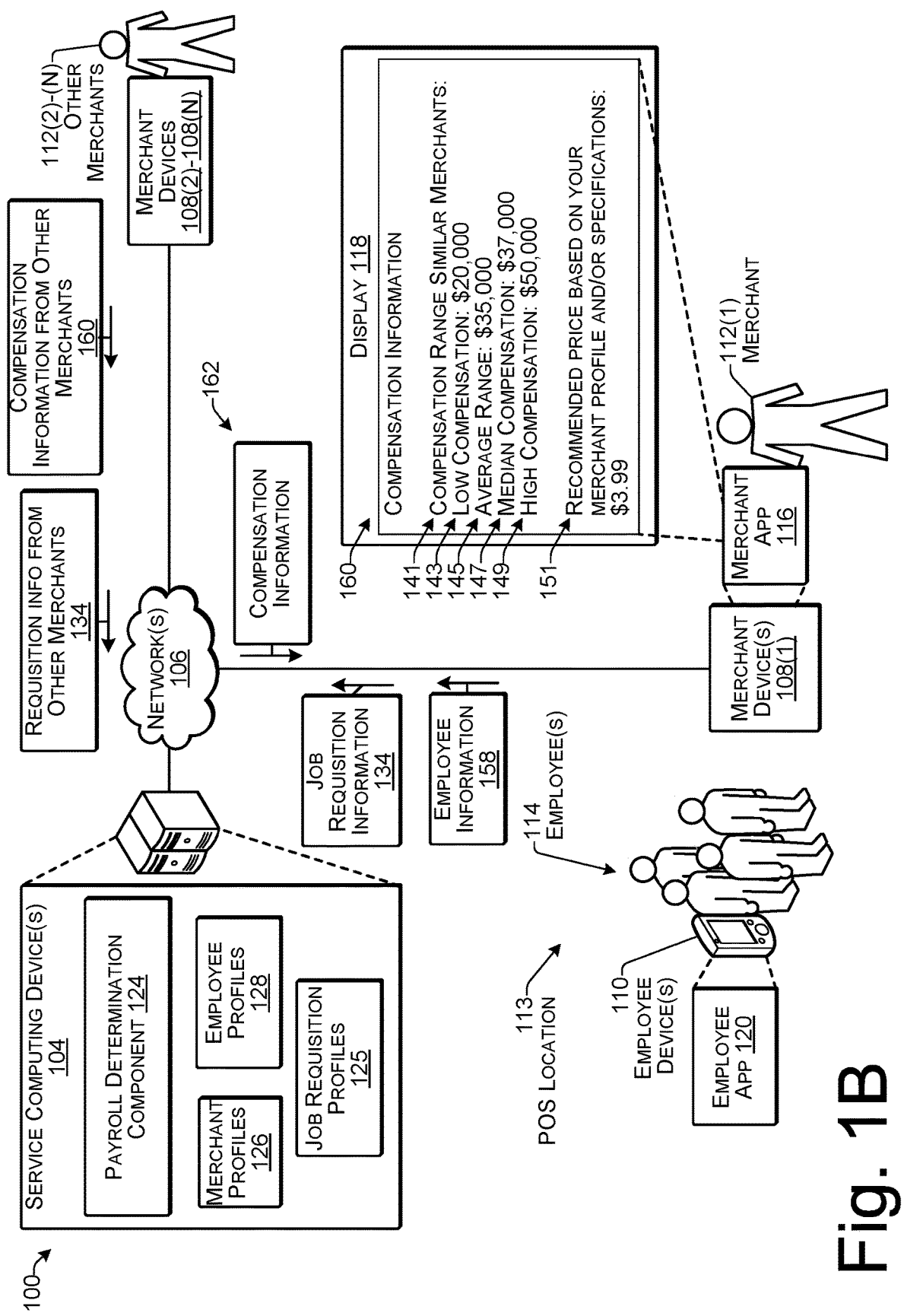
FIG. 1B illustrates an example environment for a payroll service that generates compensation recommendations in any scenario involving merchant and their employees according to some implementations.

FIGS. 1A and 1B illustrate an example environment 100 for a payroll service according to some implementations. For instance, the environment 100 may enable a service provider 102 to provide a payroll service in which employers are able to add new employees to a payroll on a compensation that is fair and competitive and as per industry and competitor standards. For instance, the environment 100 may enable a service provider to provide compensation recommendations and other compensation information to a merchant to assist the merchant in determining a compensation to offer to their employees.

The employer 112 may have a business that employs one or more employees 114. As used herein, an employee 114 may include any individual hired by an employer 112 to perform work in exchange for payroll payments (also referred to as compensation, including but not limited to wages, gratuities, stock options, medical and other perks, and other forms of remuneration), and may include an individual employed by the employer 112 in the past, an individual presently employed by the employer 112, or an individual to be employed by the employer 112 in the future. Further, in some examples, an employee 114 may include an independent contractor or agent that receives payroll payments from an employer 112. Furthermore, a payroll may include a list of one or more employees 114 of employer 112, and an indication of an amount that each employee 114 is currently paid and a recommended compensation as well. In addition, an employer 112 may be any entity that hires employees 114 to perform work and pays the employees 114 from the payroll. The compensation may be changed dynamically based on time of the day or month, nature of transaction, or other such trigger factor, such as change in attrition rate, change in market conditions, time of the year (holidays, etc.), change in competitor's compensation, etc. Once selected or set, the compensation can be kept static for a period of time, such as a month, unless the employer or employee specifically requests compensation review, for example.

Also, one or more service computing devices 104 may be associated with the service provider 102, and may be able to communicate over one or more networks 106 with one or more employer computing devices 108 and one or more employee computing devices 110. In some examples, an individual employer computing device 108 may be associated with a particular employer 112, and an individual employee computing device may be associated with an individual employee 114. The employee computing device may be a point of sale terminal, reader, or a computing device through which the employee is enabled to directly or indirectly sell or offer for sale items or services to employees.

The employer computing device 108 may include an employer application 116 that may present a user interface 118 to enable the employer to, among other things, manage payroll information and employee information. In some examples, the employer application 116 may be a web browser, or the like, that enables the employer to access and manage payroll information via one or more webpages. In other examples, the employer application 116 may be an application, such as a mobile application or desktop application, which is provided by the service provider, or may be an otherwise dedicated application. Further, in some cases, the employer application 116 may also function as, or be able to operate concurrently with, a merchant application to enable the employer or employees of the employer to conduct point of sale transactions, such as for the sale of goods or services (referred to hereinafter as "items").

In addition, the employee computing device may include an employee application 120 that may present a user interface 122 to an employee, such as to enable the employee to receive job requisition information from the employer 108 and provide employee information to the service provider computing device 104. In some examples, the employee application 120 may be a web browser, or the like, that enables the employee to access and manage employee information via one or more webpages or other user interfaces 122. In other examples, the employee application 120 may be an application, such as a mobile application or desktop application, which is provided by the service provider 102, or may be an otherwise dedicated application. The employee application 120 also includes additional functionalities to facilitate the employee to accept and process payment transactions. For example, the employee application 120 may be connected to the payment service 102 that sends updated inventory, catalog and pricing information of the items for the employee to use when checking out items. Even though the description herein may be specific to a merchant and employees, in some implementations the description can be extended to other industries as well.

The service computing device 104 may include a payroll determination component 124 that is able to receive employer information and save the employer information in respective employer profiles 126, such that each employer profile 126 may be associated with a respective employer. In addition, the service computing device 104 may receive employee information, and may save the employee information in respective employee profiles 128, such that each employee profile 128 may be associated with a respective employee. The service computing device 104 also includes job requisition profiles 125, which indicates characteristics of the job requisition and the compensation against each job requisition as per one or more varying factors, such as such as change in attrition rate, change in market conditions, time of the year (holidays, etc.), change in competitor's compensation, etc. Once selected or set, the compensation can be kept static for a period of time, such as a month, unless the employer or employee specifically requests compensation review, for example.

As one example, suppose the employer 112 has opened a new job requisition 134 and wants to add the new employee 114 to the employer's payroll. The job requisition information 134 may include a job title, city/state/postal code, job description, employment eligibility, availability (full-time/part-time), name of the employer, and salary range, etc. In another example, suppose that the employer 112 has hired a new employee 114 and wants to add the new employee 114 to the employer's payroll. In yet another example, consider an existing employee 114 requesting a compensation review. The employer 112 may send an employee request 130 to the service computing device 104. For example, a new employee request 130 may include a name or other identifier of the new employee, and contact information, such as at least one of an email address, a telephone number, or the like, including request for recommendation of compensation.

In response, the payroll determination component 124 on the service computing device 104 may analyze the employer profiles 126 and/or the employee profiles 128 for determining payroll information 160 to send to one or more of the merchants 108 for the new job requisition or for the job requisition/role for which the employee was selected, obtained from employee profile 126. For instance, the service computing device 102 may send the payroll information 160 with an electronic communication to the employer computing device 108(1) . . . (N) collectively referred to as employer computing device 108. The communication may include the payroll information 160 for one or more items offered by the merchant 108(1). For example, the payroll information 160 may be sent to the employer computing device 108(1) in response to e.g., a request received from the employer computing device 108(1), or in response one or more triggers determined by the service computing device 102, such as determining that a particular merchant's employee base has changed, employee work hours have changed, the rate of attrition has changed, the merchant in the proximity have changed compensation, or other market changes have occurred that may cause the merchant to want to change the compensation of their employees. In some cases, the employer computing device 108(1) may present the payroll information 160 in a window or at a designated location in a user interface (UI) presented on a display associated with the employer computing device 108(1).

As illustrated in the example of FIG. 1B, suppose that the service computing device 102 has sent the communication including the payroll information 160 for a particular job requisition, i.e., job position A in this example, to the first employer computing device 108(1). The payroll information 160 may include a compensation range 141 of compensations offered by merchants who are determined to be similar to the first merchant 108(1), such as by being classified in a same merchant category as a first merchant and/or in a same location category as the first merchant. The compensation range 141 may include any of a low compensation 143, an average compensation 145, a median compensation 147, or a high compensation 149. For example, the low-compensation 143 may be the lowest compensation at which job is offered by similar merchants in the region. Additionally, the high compensation 149 may be the highest compensation at which job is offered among similar merchants in the region. Furthermore, the average compensation 145 and the medium compensation 147 may be the average compensation and the median compensation, respectively, among all merchants that are determined by the service computing device 104 to be similar to the first merchant 108(1). As discussed in detail elsewhere herein, similar merchants may be classified in the same merchant category and/or in the same location category as the first merchant 108(1).

In addition, the payroll information 160 may include a recommended compensation 151 which may be a recommended compensation personalized for the first merchant 108(1). For example, the recommended compensation may be determined based on a number of factors, such as the average compensation 144 or median compensation 146, one or more characteristics of employees that the merchant has expressed an interest in attracting, an overall compensation strategy of the merchant for the business, a cost of resource for the merchant, a profit margin desired by the merchant, a volume of the items that the merchant wishes to sell over a specified period of time, and so forth. In some examples, as discussed additionally below, the merchant application may present a user interface to enable the merchant to interact with the payroll information 160, such as to determine different projected activities and sales margins for different possible ranges of compensations of employees, or the like.

In the example of FIG. 1B, for determining the payroll information 160, the service computing device 102 may receive transaction and employee information 120 for a large number of POS transactions between employees 114 and buyers at a plurality of POS locations, and say using employee computing devices 110 or POS devices 110, for a variety of items. Further, in some examples, the service computing device 102 may receive the compensation information directly from the plurality of merchants 108. The payroll determination component 132 may analyze the received transaction information 120 and/or the received compensation information for determining payroll information 160 that is personalized for the first merchant 108(1). In some cases, the payroll information 160 provided to the first merchant 108(1) may indicate the compensations that other merchants in the same geographic region.

As another example, the payroll determination component 132 may determine, e.g., from the employee profiles 128, the compensation sensitivity of the employees 114 that already shop at the first merchant 108(1). For instance, the payroll determination component 132 may determine whether the first merchant would be likely to lose employees if the first merchant were to decrease or keep the compensation of employee unchanged. For example, the payroll determination component may determine a subset of the employee profiles that contain transaction information indicating the employees having the same role at other merchants. The payroll determination component may determine how much the employees paid for at the other merchants. If the employees 114 corresponding to the subset typically paid more at the other merchants than the compensation that the first merchant 108(1) is currently offering, then it is likely that the first merchant 108(1) would be able to keep the compensation as-is without losing the employees. On the other hand, if the employees corresponding to the subset typically paid the same or less than the compensation that the first merchant 108(1) is currently offering, then the payroll determination component may recommend that the first merchant maintain, decrease, or increase the compensation in proportion to other merchants in the region or even go above and below the market conditions accordingly.

In some examples, the first merchant 108(1) can specify to the payroll determination component 132 the type of employee who the merchant would like to hire and/or the type of business model under which the merchant would like to operate. As mentioned above, as one example, the merchant may wish to hire employees that are willing to work weekends and offer higher compensations or, as another example, the merchant may wish to hire for weekday shifts only and offer lower compensations. Accordingly, the recommended compensation 151 may take into consideration the desired employee base and business model of the first merchant 108(1) when determining the personalized payroll information 160 for the first merchant 108(1). Thus, implementations herein may assist the first merchant 108(1) in managing, at least in part, the type of employee with which the first merchant 108(1) will do business and the type of business the first merchant 108(1) will operate.

In some examples, the payroll determination component 132 may send the payroll information 160 to the first merchant 108(1) in response to determining that the employee base of first merchant 108(1) has changed since the last time the first merchant 108(1) set the compensation for the employee. For example, in response to this finding, the payroll determination component 124, may recommend that the first merchant 108(1) adjust the compensations offered for one or more items, including employee, based on the change in the employee base of the first merchant 108(1). For instance, to maintain the current employee base, the first merchant 108(1) may have to adjust the compensation of employee downward, if the employee profiles 128 of the regular employees 114 indicate that the current employees 114 are paying less for employee at other merchants. Alternatively, the payroll determination component 124 may recommend that the first merchant 108(1) increase the compensation of employee if the employee profiles of the regular employees indicate that the first merchant 108(1) is able to raise the compensation currently offered.

Further, in some examples, the first merchant 108(1) may have specified a relatively fixed compensation margin when requesting compensation information. Accordingly, the payroll determination component 124 may recommend that the first merchant 108(1) adjust the compensation up or down to maintain the fixed margin. As another example, the first merchant 1081) may provide financial data to the payroll determination component 124, such as overhead costs, inventory costs, desired profit margin, and so forth, to enable the payroll determination component 124 to take this financial data into consideration when determining compensation for employee, such as for maintaining particular profit margins, and so forth.

In some examples, the payroll information 160 may be provided to the first merchant 108(1) when the first merchant 108(1) is starting his or her business, such as to enable the first merchant 108(1) to determine compensation for employee and various other items to be offered by the first merchant 108(1). As mentioned above, the payroll information 160 may be personalized for the particular employee base desired by the particular merchant. For instance, the payroll determination component 132 may determine, from the employee profiles 128, a subset of the employee profiles that share one or more common characteristics desired by the first merchant 108(1). For example, the subset may be selected based on one or more common demographic characteristics, such as: employee location, employee education; employee occupation; employee certifications, employee memberships in associations, and so forth. Additionally, or alternatively, the one or more common employee characteristics may be selected based on employee preferences, such as type of items that the employees has expertise in, a time of day and day of the week on which employees tend to work, categories of merchants at which the employees work, average amount spent per transaction, and so forth. As one example, suppose that the payroll determination component 132 determines, from the employee profiles 128, a subset of the employee profiles 128 that have a plurality of the above-listed characteristics. The payroll determination component 132 may determine the compensation that the subset of employees typically pay for employee at merchants similar to the first merchant 108(1), so that the first merchant 108(1) can compensation employee appropriately for the employees to which the first merchant 108(1) would like to offer. Of course, additional perks or other efforts, in addition to appropriate compensation, may also be necessary to get the desired employees to accept merchant's offer to work. Furthermore, as new employees become regular employees, the payroll determination component 132 may recommend that the merchant adjust the compensation and/or various other items based on the compensation information of the employee profiles corresponding to the employees that are regularly conducting transactions with the first merchant 108(1). Numerous other variations will be apparent to those of skill in the art having the benefit of the disclosure herein.

In one implementation, the payroll determination component 124 may use the contact information (e.g., email address, phone number, etc.) to send the employment information portion, including the compensation recommendation, to the employer computing device 108. As one example, the email communication may include a link for the employee to select to provide job requisition information 134 to the service computing device 104. For instance, selection of the link may cause the browser or other employee application 120 to navigate to a network location to present a user interface including blank boxes, or the like, to enable the employee to fill in the requested employee information. As another example, the employee application 120 may be configured to present the UI 122 in response to code in the communication 132. In some cases, the employee information may be sent to the service computing device 104 incrementally, e.g., as the employee fills in each blank. Alternatively, the employee information may be sent together as a batch, such as in response to the employee selecting a send button, or the like, upon completion of the form(s) or otherwise providing requested information to the UI 122.

As described above, the employee information 158 and the employer information from employer profiles 126 may be used to generate compensation recommendation. Examples of employee information 158 that may be provided by the employee and may include the employee's first, middle, and last names 136; mailing address 138; city, state, and postal code 140; telephone number 142; email address 144; tax payer identifier (SSN, ITIN) 146; date of birth 148; federal withholding information (e.g., a filled-out IRS Form W-4) 150; desired wages state withholding information 152 (if the relevant state has an income tax); employment eligibility (USCIS Form I-9) 154; bank account information for receiving direct deposit of payroll payments and so forth. In some examples, additional information (not shown) may be provided by the employee, such as marital status, sex, country of citizenship, passport number, and so forth. For instance, approximately thirty fields may be completed in some examples to provide the above information and/or other information to the service computing device 104.

When the employee information 158 is received from the employee computing device 110 by the service computing device 104, the payroll component 124 may apply the employee information to the payroll for the employer profile 126 corresponding to the particular employer who requested that the new employee be added to the payroll. For example, the payroll component 124 may schedule a next payroll payment to be made to the employee based, e.g., on a start date of the particular employee, wage information for the employee, and so forth. For example, the payroll component may receive payroll information 160 from the employer that indicates an amount to be paid to the employee, such as on an hourly basis, a salary basis, a commission basis, gratuities, and so forth. Further, the payroll information 160 may specify how frequently the employee is to be paid, and/or may include other information, as discussed herein.

As mentioned above, the employee may provide the employee information 158 to the service provider 102 only one time, and the employee 114 may subsequently use this employee information 158 when starting jobs with additional employers. For instance, if the employee quits the job with the current employer and goes to a new employer that uses the service provider 102 for payroll processing, then the new employer may merely provide one or more identifiers of the employee, such as name and email address, SSN, or the like, and the employee does not have to re-enter any of the employee information 158 unless there are changes that have not yet been updated.

Further, the employee 114 may update the employee information 158 in the employee's own respective employee profile 128, such as by accessing the employee profile 128 through a browser or other application 612, and the payroll component 124 may automatically apply the updates without any action on the part of the employer 112, and/or in response to the job requisition. As one example, suppose that the employee 114 wishes to change the number of withholding exemptions in the employee's W-4 form. The employee does not have to ask the employer for access to the employee's information, but rather may access the employee profile 128 and make the desired changes to the withholding exemptions. Changes to other types of information such as address, phone number, email address, desired wages, etc., may be made in a similar manner. Further, even in the case that the employer does not use the payroll service provided by the service provider 102, the employee may still download prefilled forms, such as IRS form W-4 and USCIS form 1-9.

In some examples, in addition to the employee information 158, the employee 114 may provide other types of information that may be stored in the employee profile 128. For example, the employee 114 may provide employee education information and/or employee employment history, which may be useful to employers or prospective employers. For example, the employee 114 may provide information that may be used to auto populate employment applications, such as education information including high school attended, whether the employee received a high school diploma, received a certificate of high school equivalency, etc., colleges or universities attended by the employee, degrees received, dates of attendance, and so forth.

Furthermore, the employee 114 may provide and/or the service provider 102 may generate employment history information for the employee 114. For instance, when the employee 114 first creates an employee profile 128, the employee 114 may provide past employment information to the service computing device 104. Subsequently, as the employee 114 uses the payroll service provided by the service provider 102, the service provider 102 may update and maintain the employment history for each additional job held by the employee 114. For example, when the employee 114 first uses the payroll service for a job with a first employer 112, the service provider 102 will know the start date of the first job, wage information, and the like, and this information may be added to the employee's employment history information, along with the name and contact information of the first employer 112. Thus, when the employee 114 applies for a new job with a prospective employer, the employee 114 may instruct the service provider 102 to send the employment history information to the prospective employer. The employee's employment history may include both employment history information provided by the employee and employment history information automatically determined and updated by the service provider 102.

Further, the employment history information may include employment reference information since the contact information of each employer may be included with the employment history of the employee. Accordingly, the service provider 102 may automatically provide employment history, including employment references for the employee 114, so that the employee 114 does not have to provide this information manually for each job for which the employee 114 applies. For example, if the contact information for a previous employer of the employee changes, the information is received in the employer profile 126 associated with the previous employer. In response, the service provider 102 may automatically update the contact information for the previous employer in the employee's employment history to enable a prospective employer of the employee to contact the previous employer so that the previous employer may continue to serve as an employment reference for the employee.

Additionally, during the course of the employee's employment at one or more jobs, the service provider 102 may further have received detailed job attendance information about the employee 114 that may be included in the employee's employment history in some cases. For example, as part of providing the payroll service, the service provider 102 may receive information regarding the days and hours worked by the employee 114 at each job. The service provider 102 may store in the employee profile 128 the hours worked by the employee 114, the days of the week worked by the employee 114, and so forth. Accordingly, the employment history may automatically include information related to the average hours worked per week by the employee 114, days of the week on which the work was typically performed, and so forth. Thus, in some examples, the employee 114 may elect to have this detailed attendance information shared with a prospective employer as well. Further, the employee may add to the employee profile 128 various other types of information that are typically requested in employment applications, so that, at the request of the employee 114, this information may be automatically provided to a prospective employer when the employee 114 is applying for a job.

In some examples, employee information 158 in the employee profile 128 may be protected from unauthorized access. For example, the service computing device 104 may require employee authorization information prior to allowing access to the employee information 158. For example, the employee authorization information may include a password, biometric information, such as a fingerprint, or other employee credential. The employee may provide this authorization information 158 to the service computing device 104 when initially providing the employee information. Subsequently, if an employer, such as a new employer wants to add the employee to the employer's payroll, in response to receiving the new employee request 130, the employee information request 132 may merely include a request for employee authorization for the employee's information to be added to the employer's payroll.

Additionally, as an alternative, rather than sending the employee information request 132 when the employee first starts working for the employer 112, the service computing device 104 may delay sending the employee information request 132 until it is time for the payroll component 124 to make a payroll payment to the employee 114. For instance, by delaying the request until a payroll payment is due, the employee is more likely to promptly and accurately complete the requested employee information 158.

As one example, each piece of the received employee information may be tagged, such as using XML (extensible markup language) tagging, to identify the semantic information for each piece of employee information. For instance, the employee first name may be tagged with a "first name" tag, the employee job title may be tagged with an "title" tag, the employee shift with "shift" tag and the employee hourly rate as "hourly", and so forth, to enable the information to be added at correct locations in the employer payroll information, the correct location in forms, such as a W-4 form, and the like. Additionally, or alternatively, each piece of employee information may be added to a corresponding field or column in a relational database. The employee information in the relational database may be associated with the employer payroll information by associating a record or row including the particular employee's information with the payroll information of the particular employer. Further, while several examples for storing and managing the employee information are discussed, numerous other variations will be apparent to those of skill in the art having the benefit of the disclosure herein.

In addition, as mentioned above, the service computing device 104 may maintain an employer profile 126 for each employer that utilizes the payroll service offered by the service provider 102. For instance, the employer profile may include the past job requisitions, compensation history, industry they belong to, the employer's employer identification number (EIN) obtained from the IRS, payroll information, such as wages to be paid each employee, dates on which payments should be made, and so forth. Further, the employer profile 126 may include employer bank account information to enable funds to be transferred from a bank account of the employer 112 to a bank account of the service provider 102. In some cases, the bank of the service provider 102 may receive one or more fund transfers from the employer's bank, and the service provider 102 may distribute a first portion of this money as payroll payments to the employees 114, and may use a second portion of this money to pay federal, state and/or local tax withholdings on behalf of the employees.

Funds may be transferred from the bank of the employer to the bank of the service provider, and from the bank of the service provider to the employees 114 using any suitable technique. As one example, money may be transferred between banks using conventional ACH (automated clearing house) payments. For example, ACH payments employ a convention adopted by the US banking industry that includes an electronic network for financial transactions in the United States. ACH processes large volumes of credit and debit transactions in batches. ACH credit transfers may include direct deposit payroll and vendor payments. ACH direct debit transfers may include consumer payments on insurance premiums, mortgage loans, and other kinds of bills. Both the US government and the commercial sectors use ACH payments. Rules and regulations that govern the ACH network are established by NACHA (National Automated Clearing House Association) and the Federal Reserve. Credit card payments are handled by separate networks overseen by the major card companies.

The service provider 102 may make payments to the employees 114 using any suitable payment techniques. As some examples, the payroll payments may be by check or by direct deposit to an account of a respective employee. For instance, the service provider 102 may mail checks to the residences of respective employees 114, or may mail the checks to the employer 112 for distribution to the employees 114 by the employer 112. As another example, the payroll payments may be made by direct deposit to bank accounts of the respective employees using ACH or any other suitable fund transfer techniques.

Figure 2:
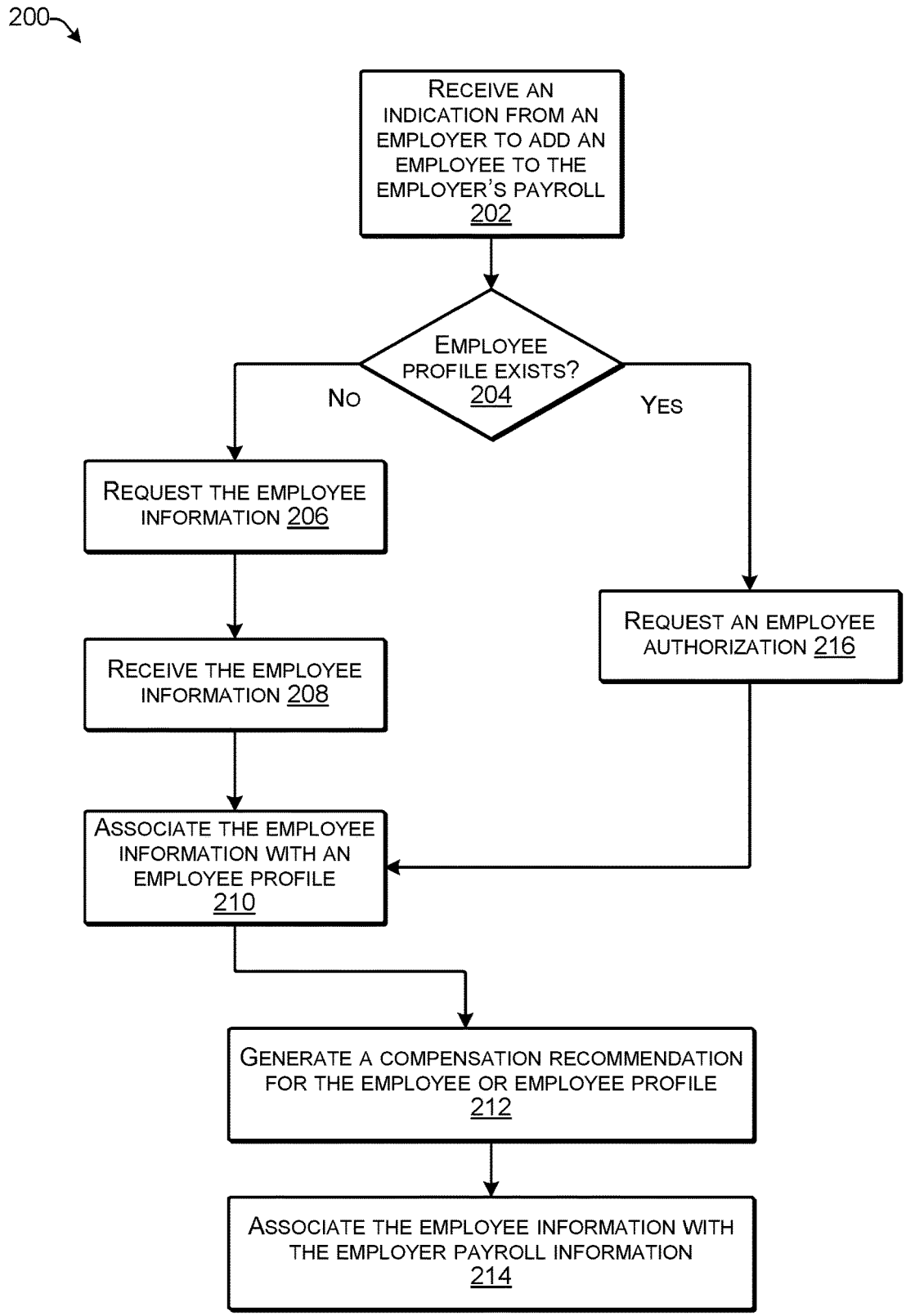
FIG. 2 is a flow diagram illustrating an example process for a payroll service according to some implementations.

FIG. 2 is a flow diagram of an example process 200 according to some implementations. In some examples, the example process 200 of FIG. 2 may be executed by the service computing device 104, or by another suitable computing device. FIGS. 2-5 are flow diagrams illustrating example processes according to some implementations. The processes of FIGS. 2-5 below are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and devices described in the examples herein, although the processes may be implemented in a wide variety of other environments, architectures and devices.

At 202, the computing device may receive an indication from an employer to add an employee to the employer's payroll or review an existing employee's payroll based on one or more trigger factors. For example, the payment service may cause the compensated to be reviewed based on trigger factors, such as time of the day or month (time of holidays), increase in chargebacks, sells, etc., nature of transaction between an employee and a customer (for example a series of high ticketed transactions), change in attrition rate (for example more employees leaving than ever before), change in market conditions (for example, higher profit margins on items offered by merchant, time of the year (holidays, etc.), change in competitor's compensation, etc. Once selected or set, the compensation can be kept static for a period of time, such as a month, unless the employer or employee specifically requests compensation review, for example.

For example, the employer may send a communication to the service computing device requesting that the service provider add an employee to a payroll of the employer. Furthermore, the employer may include with the communication an identifier of the employee, which may enable the service provider to identify an employee profile of the employee and/or which may enable the service provider to contact the employee. As one example, the employer may provide an email address of the employee, a telephone number of the employee, or the like, to the service provider. As another example, the employer may provide a social security number, name, or other identifier, which the service provider may cross-reference with existing employee profiles to attempt to locate a matching employee profile for the particular employee. The employer may also provide a job requisition number, or other attribute identifying job requisition for which the compensation needs to be generated.

At 204, the computing device may determine whether there is an existing employee profile for the employee. For instance, as mentioned above, the service provider may attempt to match the received employee identification information with information in the existing employee profiles maintained by the service provider.

At 206, if the computing device is unable to locate a matching employee profile, the computing device may send a request for employee information to the employee. For example, the computing device may send an email, text message, or other electronic communication to the employee requesting that the employee provide the requested employee information. For instance, the computing device may send an email that includes a link to connect the computing device of the employee to the computing device of the service provider to enable the employee to provide the requested employee information. As one example, the communication may include a link or other network reference that connects a web browser or other application of the employee to a service provider website that enables the employee to enter requested information into an HTML form, a webpage, or the like.

At 208, the computing device may receive the employee information. As one example, the employee may fill in text boxes, or the like, that request specific information. The employee information provided by the employee may be sent from the employee computing device to the service computing device of the service provider. In some examples, the employee information may include a full name of the employee, a mailing address of the employee, a telephone number of the employee, an email address of the employee, a taxpayer identifier of the employee, a date of birth of the employee, federal withholding information of the employee, state withholding information of the employee, employment eligibility information for the employee, bank account information of the employee, such as for receiving a direct payroll deposit, and so forth.

At 210, the service provider may associate the employee information with an employee profile. For example, in the case that the service provider uses a relational database, the information provided by the employee may be related to the employee profile in the relational database. Further, numerous other techniques may be used for storing the employee information, and for relating the employee information to the employee profile and/or to the employer payroll information.

At 212, the payment service determines a compensation recommendation for the employee based on a variety of factors. For example, the payment service analyzes employee performance with respect to comparable employees at the merchant location and at other merchant locations. A predictive, heuristic or deterministic model may be used to determine a set of employees or merchants relevant to the current employee. The compensation recommendation may be a dynamically changing value, for example changing based on the transactions hat the employee is performing or other employees are performing. Furthermore, the compensation recommendation may be higher, lower or the same as the current compensation of the employee. Such recommendations help the merchant to adjust the compensation to avoid attrition, for example, and/or reward the employees as per market trends. Also, the compensation recommendations may help in leveling the competition and benchmarking a specific industry or even more granular to a level of position, and in helping the merchant make more intelligent decisions with respect to compensation.

Also, if the employee information has been or will be associated with the employer payroll information, the computing device may send at least a portion of the employee information to the employer, such as to the computing device of the employer. As one example, the portion of employee information sent to the employer may include at least information that requires signature and/or verification from either the employee or the employer. For instance, the employer and or the employee may be required to sign a federal employment eligibility form, which may be sent to the employer to be printed out prefilled with the employee's information. As another example, the employee may be required to sign a tax withholding exemption form, which may be sent to the employer or the employee in a prefilled condition able to be printed for the required signature. Additionally, in some examples, all the employee information added to the employer payroll information may be sent to the employer and/or the employee for verification that the information added to the employer payroll information is accurate.

At 214, the computing device may associate the compensation recommendation and the employee information with the employer payroll information of the employer that requested the employee be added to the employer's payroll. The employee information may be associated with the employer's payroll, and may be used when determining a payroll payment to be made to the particular employee, such as for determining the amount of taxes to be withheld from the payroll payment, the SSN with which the tax withholdings should be associated, a bank account to which the payroll payment should be deposited, and so forth.

At 216, on the other hand, if an employee profile already exists for the identified employee, the computing device may request an employee authorization to associate the employee information with the employer payroll information. As one example, the service provider may receive implicit authorization for associating the employee information with the employer's payroll, such as by the employee submitting requested employee information to the service provider, either through the employee's own computing device, or through a computing device of the employer. As another example, the service provider may receive explicit authorization, such as by receiving a password, shared secret, and/or biometric information of the employee as an indication of the authorization from the employee to associate the employee information with the payroll information of the employer. The computing device may determine whether an authorization of the employee has been received. As mentioned above, in some examples the authorization may be explicit, while in other examples, the authorization may be implicit. If an authorization is not received from the employee, the computing device may send a communication to the employer to inform the employer that the employee has not provided authorization to associate the employee's information with the employer's payroll information. On the other hand, if authorization is received from the employee, the employee information is associated with the employer payroll information as discussed above with respect to 212 and 214.

Figure 3:
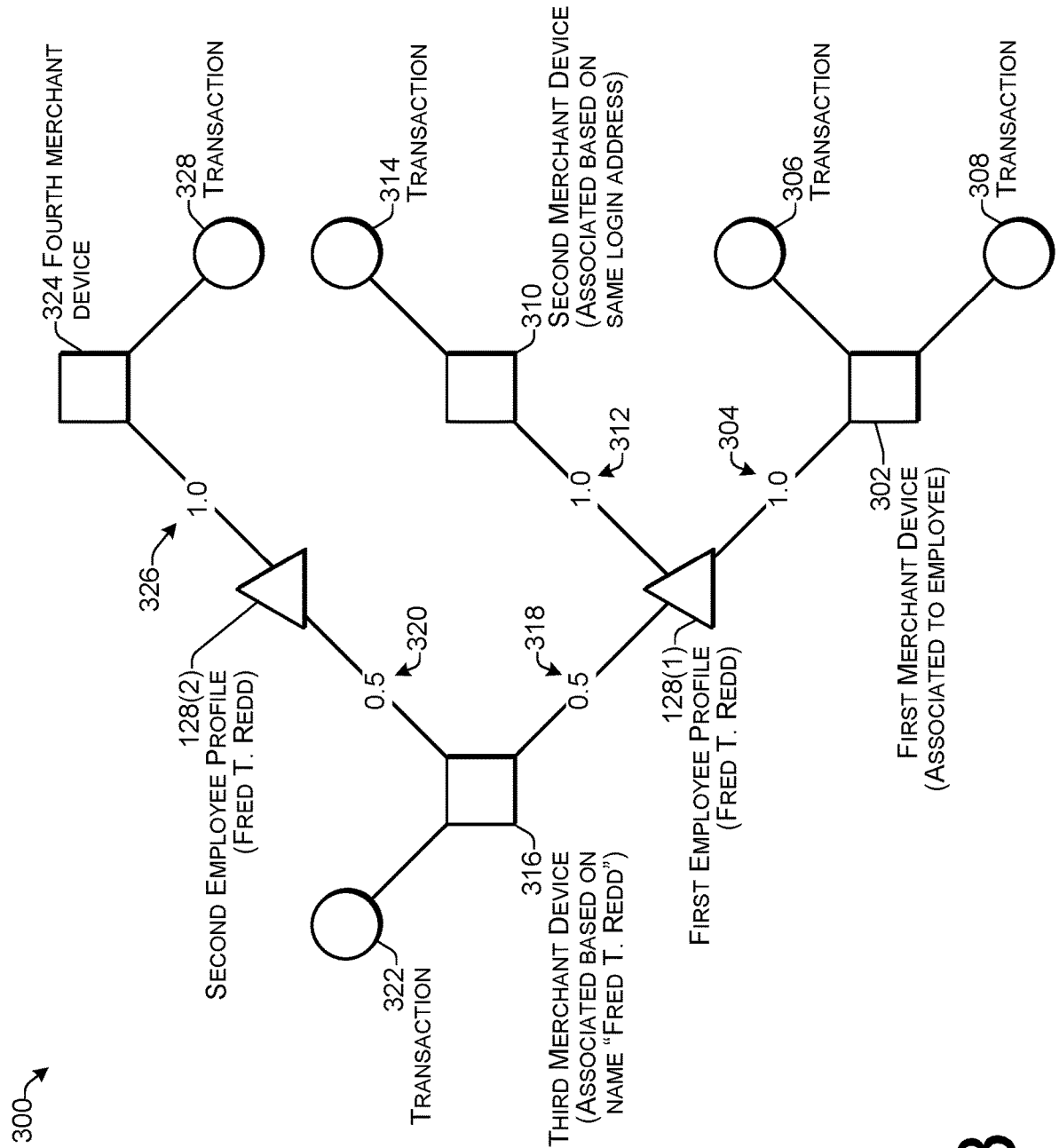
FIG. 3 illustrates an example probabilistic model for associating transactions with employee profiles according to some implementations.

FIG. 3 illustrates an example probabilistic model 300 for associating transactions with employee profiles according to some implementations. In one implementation, the probabilistic model 300 is used to track employee performance, such as hours spent on buyer transactions, map performance to the compensation received, and compare the compensation to comparable employees at other merchant locations. In this example, the probabilistic model 300 includes a weighted graph in which triangular nodes represent employee profiles, such as a first employee profile 128(1) and a second employee profile 128(2), respectively. The probabilistic model 300 indicates the probabilities that particular transactions are associated with particular employee profiles, such as based on employee use of different merchant devices, as discussed above with respect to FIG. 2, and further based on the information included with each transaction and the information already included in each employee profile 128. The probabilistic model 300 can be used to determine whether to associate a particular transaction with a particular employee profile, and to determine when to merge employee profiles 128 and/or to indicate when new employee profiles should be created.

In the example of FIG. 3, the probabilistic model 300 shows that the triangular node that represents the first employee profile 128(1) is associated with a square node 302, which represents a first merchant device with a 1.0, i.e., 100 percent, confidence score, as indicated at 304. The confidence score 304 indicates that the financial transactions conducted using the first merchant device correspond to the first employee profile 128(1) with a confidence of 100 percent, but, of course, this confidence score may not necessarily authorize a employee to use the corresponding merchant device, as such authorizations are managed separately. Circular nodes 306 and 308 represent respective transactions that were conducted using the first merchant device, and are thereby associated with the node 304. Accordingly, the transaction information corresponding to the transactions 306 and 308 can be associated with the first employee profile 128(1) with a confidence level of 100 percent.

The triangular node that represents the first employee profile 128(1) is also associated with a square node 306, which represents a second merchant device with a 1.0 confidence score. For example, suppose that the first employee associated a particular email address/login address with the first employee profile 128(1), such as when signing up for an employee account. Subsequently, suppose that the first employee used the second merchant device for a different transaction and logged in with the same login address associated with the first employee profile. Accordingly, based on matching of the login address associated with the second device and the email address previously associated with the first employee profile 128(1), the second merchant device may be associated with the first employee profile with a 1.0 confidence score, as indicated at 312. This confidence score 312 indicates that transactions, such as a transaction represented by a circular node 314, conducted using the second merchant device may be included in the first employee profile 128(1) with a confidence level of 100 percent.

In addition, the model 300 shows the triangular node 302 that represents the first employee profile 128(1) and the second triangular node that represents the second employee profile 128(2) are both associated with a square node 316, which represents a third merchant device. For example, suppose that when the transaction information including the third merchant device information was received, an identifier associated with the third merchant device did not the match login identifiers in any current employee profiles. Further, suppose that the name associated with the third merchant device (Fred T. Redd) is the same as the names associated with two employee profiles, i.e., the first employee profile 128(1) and the second employee profile 128(2). Accordingly, the third login may be associated with the first employee profile 128(1) and the second employee profile 128(2) using a 0.5, or 50 percent, level of confidence as the confidence score, as indicated at 318 and 320, respectively. Consequently, the model 300 indicates that there is a 50 percent probability that a transaction represented by a circular node 322 conducted using the third merchant device was performed by the first employee associated with the first employee profile 128(1) and a 50 percent probability that the transaction was conducted by the second employee associated with the second employee profile 128(2).

Accordingly, in some examples, the transaction information for the transaction represented by node 322 may not be associated with either of the first profile 128(1) or the second profile 128(2), since a name is not always a reliable indicator of an individual identity. However, in other examples, other information included with the transaction information may be taken into consideration to change the confidence levels 318, 320. For instance, the second employee profile 128(2) may have a fourth merchant device associated, as indicated by square node 324, with a confidence score of 1.0, as indicated at 326. Accordingly, a transaction corresponding to circular node 328 may be associated with the second employee profile 128(2) with 100 percent confidence.

As an example, suppose a comparison of the item purchase information from the transaction associated with node 322 with the item purchase information for the transactions associated with nodes 306, 308, 314 and 328 indicates that the transaction associated with node 322 took place at the same merchant POS location and at the same approximate time of day, but on a different date, as the transaction associated with node 308. Further, suppose that the transaction associated with node 328 and associated with the second employee profile 128(2) took place in a different location from the transactions associated with nodes 306, 308, 314 and 322. Furthermore, suppose that the transaction associated with node 308 has a $2 tip, and that the transaction associated with node 322 has a $1.50 tip. Accordingly, in some instances, the transaction information (and tip behavior) for the respective transactions may be used to substantially change the confidence scores 318 and 320, which, if the confidence score exceeds a threshold, results in the transaction information associated with node 322 being associated with the first employee profile 128(1).

As one example, probabilistic model 300 may include a trained statistical model that accounts for numerous pieces of information included in the transaction information for various types of transactions, such as location of the transaction, type or category of merchant, time of day of the transaction, day of the week, items purchased through the transaction, descriptors of items purchased, gratuities received, and so forth, in addition to information such as employee and merchant device identifier, name associated with the merchant device, and any other information, such as email addresses, home or business addresses, phone numbers, etc. The statistical model may be initially trained using a set of training data, checked for accuracy, and then used for matching transactions with particular employee profiles by determining confidence scores, and associating a particular transaction with a particular employee profile when a confidence score exceeds a specified threshold of confidence. The statistical model may be periodically updated and re-trained based on new training data to keep the model up to date. Examples of suitable statistical models that may be incorporated into the one or more probabilistic models 300 herein may include regression models, such as linear regression models, and stochastic models, such as Markov models, hidden Markov models, and so forth.

For example, suppose that, based on analysis of the item purchase information for the transactions associated with nodes 306, 308, 314, 322 and 328, the confidence score 318 is greater than 0.8, while the confidence score 320 is correspondingly less than 0.2. As one example, suppose that the threshold for associating transaction information with an employee profile is 0.8. Then, if the probabilistic model 300 indicates a confidence score that is greater than 0.8, the transaction information associated with the node 322 may be associated with the first employee profile 128(1). Thus, the employee profiles 128 may indicate the performance activity and transaction activity of an associated employee across multiple employee accounts or other payment devices.

Accordingly, the analysis component 818 may be configured to harmonize the transaction information that is received from various merchant devices so that orphan or otherwise disconnected sets of transaction information that correspond to different merchant devices or electronic payment accounts, etc., can be matched to or otherwise associated with particular employee profiles. In some examples, the analysis component 818 can apply the probabilistic model 300, for example, by utilizing one or more of a weighted graph model, a probabilistic data store and/or a trained statistical model.

To generate and/or apply the probabilistic model 300, the analysis component 818 may be configured to match, either exactly or heuristically, employee information and/or item information included in the transaction information using one or more common characteristics. Characteristics that can be used to match transactions include a login address linked to the transaction (e.g., a receipt email address) or the name used by an employee in an email username string, e.g., "fred.redd@example.com," to name a few examples. However, the techniques described herein can be performed using any type of characteristic that can identify a employee. Further, some characteristics, such as email address, phone number or merchant device identifier, may have a higher level of confidence than other characteristics such as employee name.

Thus, the probabilistic model 300 may represent associations between employee profiles, respective merchant devices, and the transactions associated with those accounts or other payment instruments. After finding a match between an employee profile and transaction information for a particular transaction, the probabilistic model 300 or the analysis component 818 can assign a confidence score that is associated with that match. For example, some types of matches, such as email addresses, merchant device identifiers, telephone numbers, and the like, may have such high confidence levels that a confidence score of 100 percent or 1.0 may be assigned if there are no other matching employee profiles. For heuristic matches, the confidence score is a probability that represents a likelihood that a particular transaction is associated with a particular employee profile, rather than a different employee profile. The analysis component 818 can update these probabilities as transaction information describing new transactions is received from the merchant devices.

The analysis component 818 can use the probabilistic model to create or add to employee profiles to provide a holistic view of a corresponding employee's shopping behavior and preferences, as compared to other employees. For example, for a particular employee, the analysis component 818 can determine based on the employee's history of transactions (using, for example, the respective itemized listing of purchases associated with those transactions) that the particular employee is likely to work weekdays or morning shifts than other similar employees. This probabilistic data point can then be added to the particular employee's employee profile.

Some types of information can be associated with an employee profile in a probabilistic manner. For example, the employee's gender and age may be determined within a certain confidence level based on the employee's name and third-party data, e.g., data from the U.S. Census Bureau, data from a social network site, data from a microblog site, or other online presences of the various different employees. The employee's work preferences can be probabilistically determined from the employee's work history. For example, if the employee always gets tips on coffee but not on meals, then a probabilistic data point indicating that this employee is better with coffee than meals may be included in the corresponding employee profile. Geographic locations corresponding to the employee's work locations can be probabilistically determined based on the geographic locations of merchants where the employee conducts transactions. For instance, the analysis component 818 can a gratuity versus location analysis to see where the employee is more active and receives more gratuities.

Various other attributes can also be probabilistically associated with the employee profile of a particular employee. For example, the analysis component 818 can evaluate the types of merchants at which the employee conducts transactions. The categories of these merchants can be determined, for example, using the merchants' self-declared business category or using merchant category codes (MCC). The MCC is a four-digit number assigned to a business by credit card companies (e.g., American Express®, MasterCard®, VISA®) when the business first starts accepting merchant devices as a form of payment. The MCC is used to classify the business by the type of goods or services provided by the business. Accordingly, if the employee is working at a particular category of merchant, e.g., a bike shop, then the employee can be probabilistically identified as a bike expert and a probabilistic data point indicating that the employee is a bike expert might be added to the employee's employee profile.

As another example, the employee's preferences for certain types of clothing, shoes, sizes, and colors can also be determined from the item information associated with the employee's transactions. For example, if the employee purchases red medium-sized shirts, then probabilistic data points indicating that the employee prefers the color red, red shirts, and medium-sized shirts, can be added to the corresponding employee profile. As described below, employee profiles for multiple employees can be aggregated in various ways to provide compensation recommendations and other information to merchants based on employee characteristics.

Figure 4:
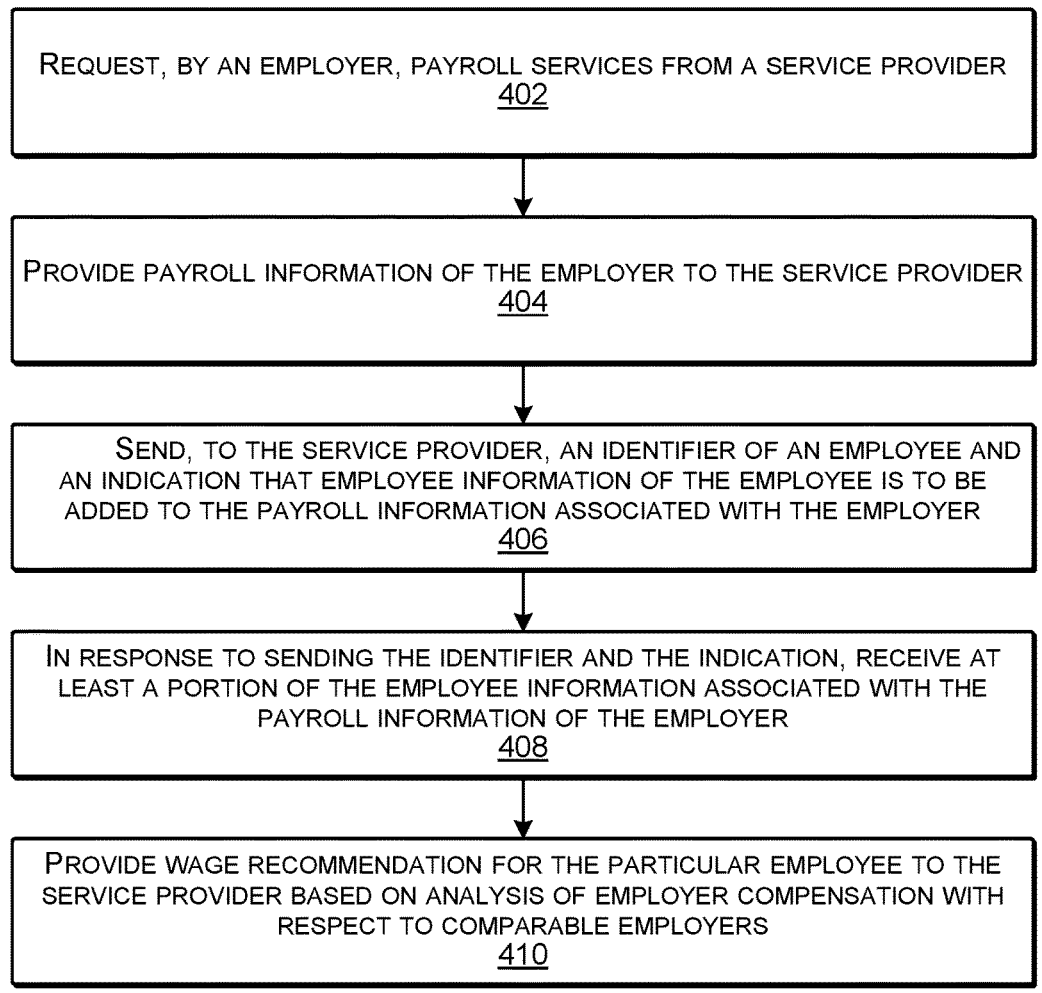
FIG. 4 is a flow diagram illustrating an example process for a payroll service according to some implementations.

FIG. 4 is a flow diagram illustrating an example process 400 according to some implementations. In some examples, the process 400 may be executed by the employee device 110, or by another suitable computing device.

At 402, the computing device may present a user interface to receive employee information. As one example, the service provider may send a communication to the employee such as an email, text message or the like, which may include a uniform resource locator (URL) or other link or reference to a network location for the employee to access in order to provide the requested employee information. Accordingly, the employee may select the link, which may cause an application on the employee computing device to present a user interface able to receive entry of the employee information by the employee.

At 404, the computing device may receive, via the user interface, the employee information. For example, the employee may enter the information into text entry areas in the user interface or may provide the employee information using any other suitable techniques.

At 406, the computing device may send the employee information to a second computing device associated with a service provider to include the employee information in an employee profile maintained by the service provider. For example, when the employee has finished entering the employee information into the user interface, or as the employee is entering information into the user interface, the information may be transmitted to the computing device of the service provider.

At 408, the computing device may send an authorization credential to be associated with the employee profile. For example, the employee may provide a password, shared secret, and/or biometric information to the service provider that can be used to control access to the employee information included in the employee profile maintained by the service provider. The computing device may receive a request from the service provider for authorization to associate the employee information with a payroll of an employer. For example, the employee may have agreed to be hired by the employer and the employer may request that the service provider provide the employee information for addition to the payroll of the employer. Prior to adding the employee's information to the payroll of the employer, the service provider may request authorization from the employee to add the employee's information to the payroll of the employer. The computing device may send an employee authorization to authorize associating the employee information with the payroll information of the employer. As one example, the employee may provide a password or other employee authorization credential as mentioned above to authorize the addition of the employee information to the payroll of the employer. As another example, the employee may provide implicit authorization to the service provider such as through one or more actions of the employee, e.g., providing the employee information in response to a court request of the service provider, or the like.

At 410, the payment service provides wage or compensation recommendation for the particular employee based on an analysis of other employers or riles comparable to the employee's.

Figure 5:
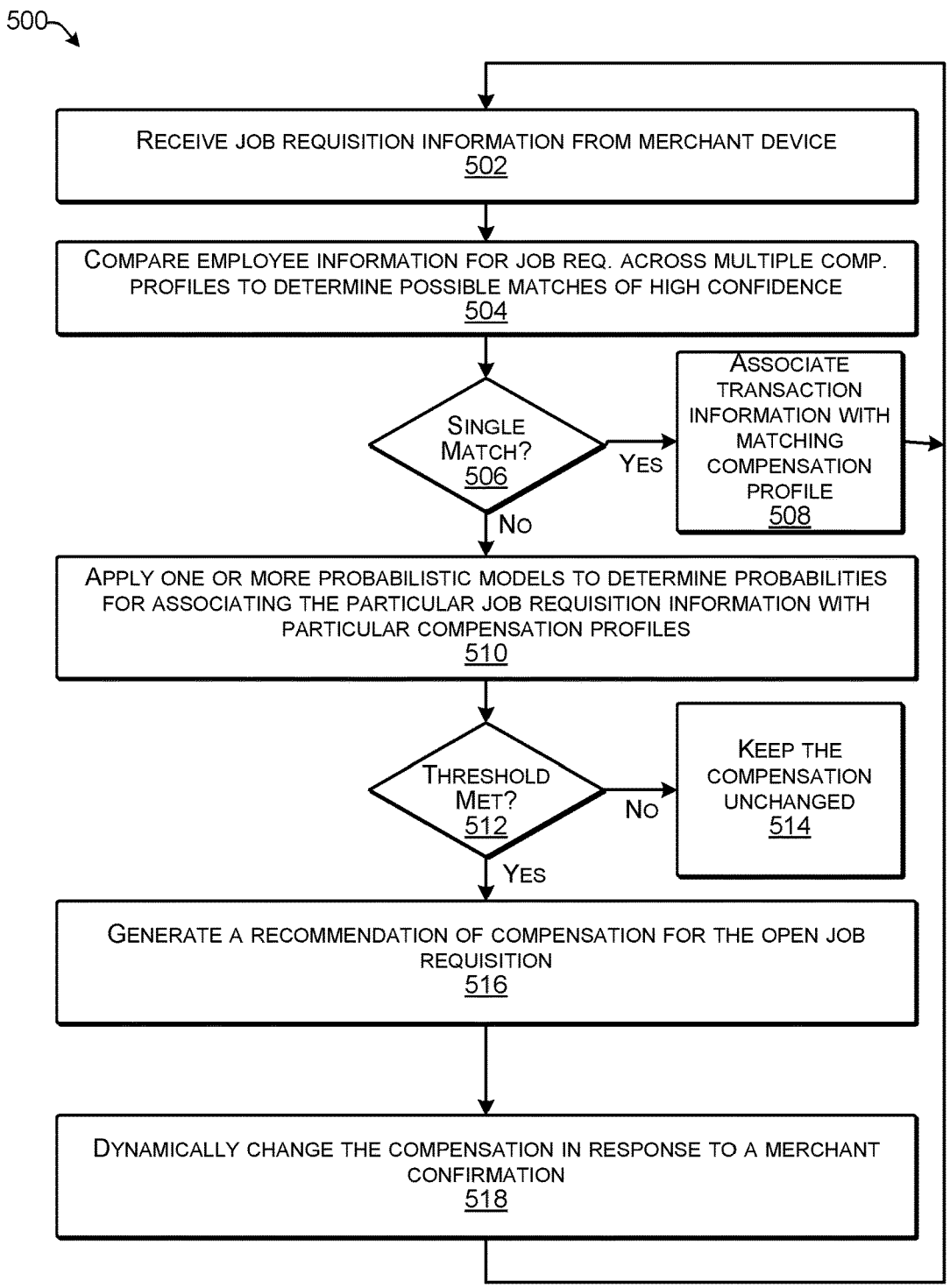
FIG. 5 is a flow diagram illustrating an example process for a payroll service according to some implementations.

FIG. 5 is a flow diagram 500 illustrating an example process for associating transactions with employee profiles according to some implementations. The process of FIG. 5 below are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. Accordingly, in some implementations, the example process 500 of FIG. 5 may be executed by one or more processors of the service computing device 102 of the service provider.

At 502, the one or more computing devices may receive POS transaction information from an employee operating a merchant device associated with a merchant at a job position. For example, as discussed above with respect to FIGS. 1 and 2, a plurality of the merchant devices associated with a plurality of different merchants may send transaction information for a plurality of transactions to the service computing device 102. Each instance of transaction information may include various amounts of employee information and item purchase information, such as discussed above with respect to FIGS. 2, 3 and 4.

At 504, the one or more computing devices may compare the transaction/position information across multiple employee profiles to determine possible matches with existing employee profiles. For example, as discussed above with respect to FIGS. 3 and 4, employee information from the transaction information may be compared with employee information associated with existing employee profiles.

At 506, the one or more computing devices may determine whether there is a match of high confidence with a single employee profile, such as through matching merchant device identifiers, email addresses, telephone numbers, payment account identifiers, a merchant incentive program identifier, or other identifiers of high confidence. For example, the confidence of a match for these types of identifiers may be sufficiently high that additional comparisons may not be required. However, in other examples, additional comparison may be performed as discussed below, such as to guard against the possibility that an incorrect phone number or email address was entered, fraudulent use of merchant devices, and so forth.

At 508, when there is a match of high confidence with a single particular employee or compensation profile, the one or more computing devices may relate or otherwise associate the transaction information to the matching employee profile. For example, in the case of a relational database, the transaction information may be related in the database to the employee profile. In other types of storage systems, the transaction information may be stored with an employee profile, or may be otherwise associated with the employee profile using any suitable techniques. As such the compensation associated to the single profile may be associated to the employee.

At 510, when there is not a high confidence match with a particular employee profile, the one or more computing devices may apply one or more probabilistic models to determine probabilities, such as confidence scores, for relating the particular transaction information with particular employee profiles. For instance, as discussed above with respect to FIGS. 3 and 4, the one or more probabilistic models may include one or more trained statistical models that take into consideration numerous different aspects of the item purchase information such as time, date, place, merchant, items purchased, information about items purchased, and so forth, as well as the employee information associated with the transaction, as discussed above.

At 512, the one or more computing devices may determine whether a threshold level of confidence is met for associating the transaction information with any of the existing employee profiles.

At 514, if the threshold level of confidence is not met for any of the existing employee profiles, the one or more computing devices may keep the current compensation unchanged.

At 516, if the threshold level of confidence is met for at least one employee profile, the transaction information may generate a recommendation of compensation for the open or the position being reviewed based on data collected from comparable merchants and employees.

At 518, the one or more computing devices may dynamically change the compensation in the payroll to replace the current compensation. The process may subsequently begin processing the next transaction received from the merchant devices or at specific time periods.

Figure 6:
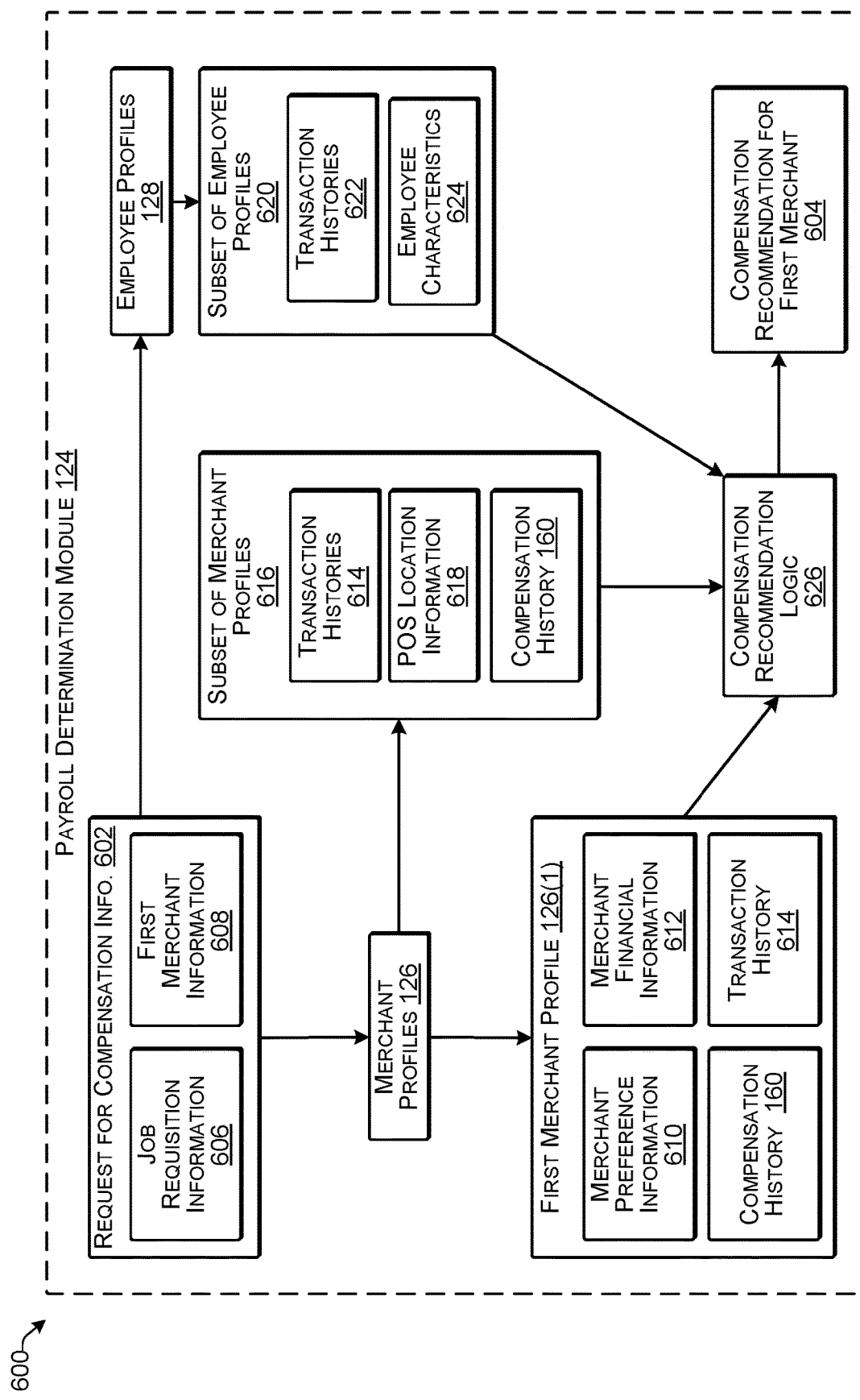
FIG. 6 is a block diagram illustrating an example of determining compensation information for a merchant according to some implementations.

FIG. 6 is a conceptual diagram 600 illustrating an example of determining compensation information for a merchant according to some implementations. As mentioned above, the payroll determination component 124 can determine one or more compensations to recommend to a particular merchant for one or more employees recruited by the merchant. The payroll determination component 124 may generate compensation information 604 to send to a particular merchant device 108 based at least in part on information in the merchant profiles 126 and/or the employee profiles 128. In some examples, the payroll determination component 124 may determine when to send the compensation information 604 to a particular merchant, such as in response to detecting a change in the customer or profit base of the particular merchant, detecting a change in the compensation of employees employed by a particular merchant, or detecting a change in other factors that may affect the recommended compensation offered by the particular merchant. Alternatively, the merchant may initiate a request for the compensation information 604 to the payment service, such as by sending a request from an associated merchant device.

In the example of FIG. 6, suppose that the payroll determination component 124 receives a compensation request 602 from a merchant device 108 (not shown in FIG. 6) associated with a first merchant. In this example, the request 602 includes job requisition information 606 that may specify one or more employees for which the first merchant would like to receive compensation information. The job requisition information 606 may correspond to a job requisition selected or otherwise identified by the first merchant, such as a job requisition already filled by the first merchant, or a job requisition that the first merchant is contemplating offering. For example, the first merchant may enter job requisition information 606 into the merchant device 108, such as by manually entering information about the job requisition. Alternatively, in some cases, the information about the job requisition may have already been entered by the merchant and, to initiate the compensation request, the job requisition may be merely selected by the merchant via a user interface, as discussed additionally below with respect to FIG. 7. As another alternative, information about the job requisition may be obtained from a network location, such as from a website or other online source of information about the job requisition. In some examples, the job requisition information 606 may include descriptive information about the job requisition, such as a title, certifications, eligibility information about the job requisition, which depends at least in part upon the nature of the job requisition.

In any of the examples above, the job requisition information may be parsed, generalized or otherwise categorized to enable more effective determination of transactions for the same or similar employees. For instance, some job requisitions may be described by a job requisition category, such as in the case that the job requisitions are generally fungible, e.g., a barista. On the other hand, for employees that are not considered fungible, such as mailman, the compensation compared may be for the same employees of the same merchant or comparable merchants.

Furthermore, the request 602 for compensation information may include first merchant information 608, which may include at least an identifier of the first merchant. For instance, the identifier may be any suitable type of identifier, such as an identifier assigned by the service provider, an identifier selected by or provided by the first merchant when signing up for the payment service, the name of the first merchant, an email address associated with the first merchant, an identifier associated with the merchant device of the first merchant, an identifier associated with an instance of the merchant application executing on the merchant device, a GPS location of the merchant device, or any other suitable identifier that can be used to match the request 602 with a first merchant profile 126(1) for the first merchant. Accordingly, the first merchant information 608 may be used to match the request 602 with the first merchant profile 126(1) from the plurality of merchant profiles 126.

In addition, in some examples the first merchant information 608 may further include additional information that may be taken into consideration when determining compensation for the one or more employees employed by the first merchant. For instance, the first merchant information 608 may include merchant preference information 610 and/or merchant financial information 612. As mentioned above, in some examples, the first merchant may express a preference for offering compensation to a particular type or category of employee, such as employees that share particular characteristics that can be identified in the respective employee profiles 128. Further, as mentioned above, in some cases, the first merchant may desire to operate a high volume business or, in other cases, the first merchant may desire to operate a low-volume business that allows more personalized attention to individual customers.

Additionally, as mentioned above, in some examples the first merchant may want the compensation recommendations to be based at least in part on the first merchant's financial considerations, which may be set forth in the merchant financial information 612. As one example, the merchant may want the employees to be remunerated such that the merchant might reasonably expect a particular profit margin outside of the remunerations As another example, the merchant may want the employees to be remunerated such that the compensation is based at least in part on the merchant's cost for acquiring the employees. Accordingly, the merchant financial information 612 may include information regarding the cost to the merchant for particular employees employed by the first merchant. As one example, the first merchant may set up a particular job requisition similar to the one of the merchants 108 that uses the payment service of the service provider herein. Consequently, the payroll determination component 124 can determine from the merchant profile 124 of the other merchant if the services offered by the employee on the particular job requisition have changed, and may take this change in cost into consideration when recommending a compensation to the first merchant for the particular job requisition.

In addition, the first merchant profile 126(1) may include the first merchant job requisition compensation information 130(1), as discussed above, which may include the current compensation that the first merchant has selected for each of the employees offered by the first merchant, as well as job requisition descriptions and/or other job requisition information related to the employees offered by the first merchant. For example, the compensation that the first merchant has selected for other employees may provide an indication of the type of business model that the first merchant is implementing, which may be used when determining compensation. For instance, if most of the first merchant's employees are remunerated over the median or average compensation, then this may be an indication that the first merchant is attempting to build a premium brand and therefore compensation recommendations for new employees may be recommended to be more than the median or average compensation.

Further, the first merchant profile 126(1) may include the first merchant's transaction history 614, which may include a record of transactions conducted by the first merchant using one or more of the first merchant device(s) 108, as discussed above with respect to FIGS. 1A and 1B. For example, if the particular existing employee for which the merchant is requesting compensation information has not sold as well at the first merchant as at other merchants who offer the job requisition for a lower compensation, then the payroll determination component 124 may take this as an indication that the first merchant should lower the compensation for the particular job requisition.

In response to receiving the request 602 for compensation information, the payroll determination component 124 may access the merchant profiles 126 to identify the first merchant profile 126(1). Further, the payroll determination component 124 may identify a subset 616 of merchant profiles corresponding to other merchants. For example, the merchant profiles in the subset 616 may be determined to be related to the request 602, such as by being associated with the same merchant category, the same location category, and or with a transaction for the same job requisition, to name a few. As one example, the subset 616 of merchant profiles may be selected based at least in part on the associated merchants offering the items or services that is the subject of the job requisition.

However, merely determining the subset 616 based on the associated merchant offering the same job requisition may skew the compensation information. Accordingly, the subset 616 may be further narrowed to merchants that are similar to the first merchants, i.e., in a same merchant category as the first merchant and/or in a same location category as the first merchant.

For example, the payroll determination component 124 may access the first merchant profile 126(1) to determine information relevant to the first merchant, such as a merchant category, merchant location information, or various other types of merchant information, such as items offered for sale, hours of operation, and so forth. Further, as mentioned above, the MCC for a merchant, or other categorization techniques, may be used to categorize similar types of merchants into merchant categories. In some examples, the merchant categories used herein do not match the MCC categories, but may be more inclusive or less inclusive categories. Similarly, the merchants (and employees) may be classified into location categories, e.g., based on POS location information 618, such as for particular categories of geographic regions, e.g., same street, same neighborhood, same postal code, same district of a city, same city, and so forth. Alternatively, of course, other location-based techniques may be used for determining merchants and/or employees in the same geographic region or within proximity to one another, etc., such as distance from a reference location, or the like. Thus, the subset 616 of merchant profiles may be limited to other merchants in the same merchant category as the first merchant, and/or in the same location category as the first merchant, and/or otherwise determined to be similar to the first merchant. Further, in some examples, the compensation information 160 selected by the other merchants associated with the subset 616 may be taken into consideration when determining similarity of the other merchants to the first merchant, such as by comparing overall compensation strategies of the respective merchants.

In addition, in response to receiving the request 602 for compensation information, the payroll determination component may access the employee profiles 128 to identify a subset 620 of employee profiles having transaction and compensation histories 622 that include one or more transactions for the particular job requisition. Further, the subset 620 may be narrowed to transactions that were conducted with the first merchant or the merchants corresponding to the subset 616 of merchant profiles, i.e., transactions for the particular job requisition that were conducted with the first merchant or merchants similar to the first merchant, and also the hourly or monthly wages received by the merchants. Typically, many of the employee profiles in the subset 620 may include employee characteristics 624, which may include demographic information that has been gathered about each employee, working habits, certifications, eligibility conditions, and preferences of each employee, and so forth. Accordingly, the employee characteristics 624 may be used to enable the first merchant to specify a category of employee to which the first merchant would like to hire for his or her business, and determine appropriate compensation for various employees based on that goal. Thus, in some cases, the subset 620 of employee profiles may be further narrowed to employee profiles that share one or more specified employee characteristics 624.

The information included in the first merchant profile 126(1), the subset 616 of merchant profiles and/or the subset 620 of employee profiles may be provided to, or accessed by, the compensation recommendation logic 626 that may use this information when determining compensation information 604 for the first merchant. For example, the compensation recommendation logic 626 may be one or more algorithms, computational models, probabilistic, deterministic or heuristic models or the like, configured to determine a compensation to recommend to the first merchant, along with the other compensation information, such as high compensation, low compensation, median compensation, average compensation, etc., of the particular job requisition among similar merchants.

As one example, the compensation recommendation logic 626 may determine a recommended compensation for the particular job requisition based on the transaction and compensation histories 614 in the subset 616 of merchant profiles of merchants that are similar to the first merchant, e.g., such as by being classified in the same merchant category. Further, in some examples, the subset 616 of merchant profiles may be limited to merchants that are classified in a same geographic category as the first merchant, e.g., same neighborhood, zip code, city, etc. Thus, the compensation recommendation logic 626 may determine the compensation of the particular job requisition at various merchants corresponding to the subset 616, may determine how many employees have been employed at various compensation over one or more periods of time, e.g., over the past week, over the past month, over the past two months, over the past year, etc., and at what compensation, and may be able to project how many units of the particular employees the first merchant may be able to support at various different compensation points. In some examples, if the first merchant has already been in business for a while, the overall sales volume of the first merchant against a plurality of employees (i.e., total number of transactions per week, month, etc.) may be compared with the overall sales volume of the similar merchants over a similar period of time, which can improve the accuracy of the projected sales volume of the particular job requisition by the first merchant at the various compensation points. Of course, additional factors may be considered when making sales predictions, with the foregoing being merely one example for discussion purposes.

As another example, the payroll determination component 124 may determine the subset 620 of employee profiles from the plurality of employee profiles 128 as discussed above, e.g., based on the associated employees having applied to the particular job requisition at least once from the first merchant or from similar merchants. Further, suppose that the first merchant wants to focus his or her business on offering to customers interested in music. Accordingly, the subset of employee profiles may be further limited based on the employee characteristics 624 to those employee profiles that meet the specified criteria. These characteristics 624 may include characteristics such as: employee residence information; employee qualifications in music, employee memberships in associations, and so forth. Additionally or alternatively, these characteristics 624 may include various behavioral characteristics including, for example, geographic locations where the employees operate or prefer to operate, the categories of merchants at which the employees operate, the positions offered to the employees, the time of day the employees operate, the average amount spent by the employees in certain merchant categories, and so forth. Thus, the compensation recommendation logic 626 may further take into consideration other transaction information in the transactions histories 614 and 622, such as time of day and days of the week during which employees were employed. For example, if the first merchant does not open for business until 4:00 pm, transactions that took place during morning hours may not be considered when determining compensation recommendations for the first merchant in some cases.

Figure 7:
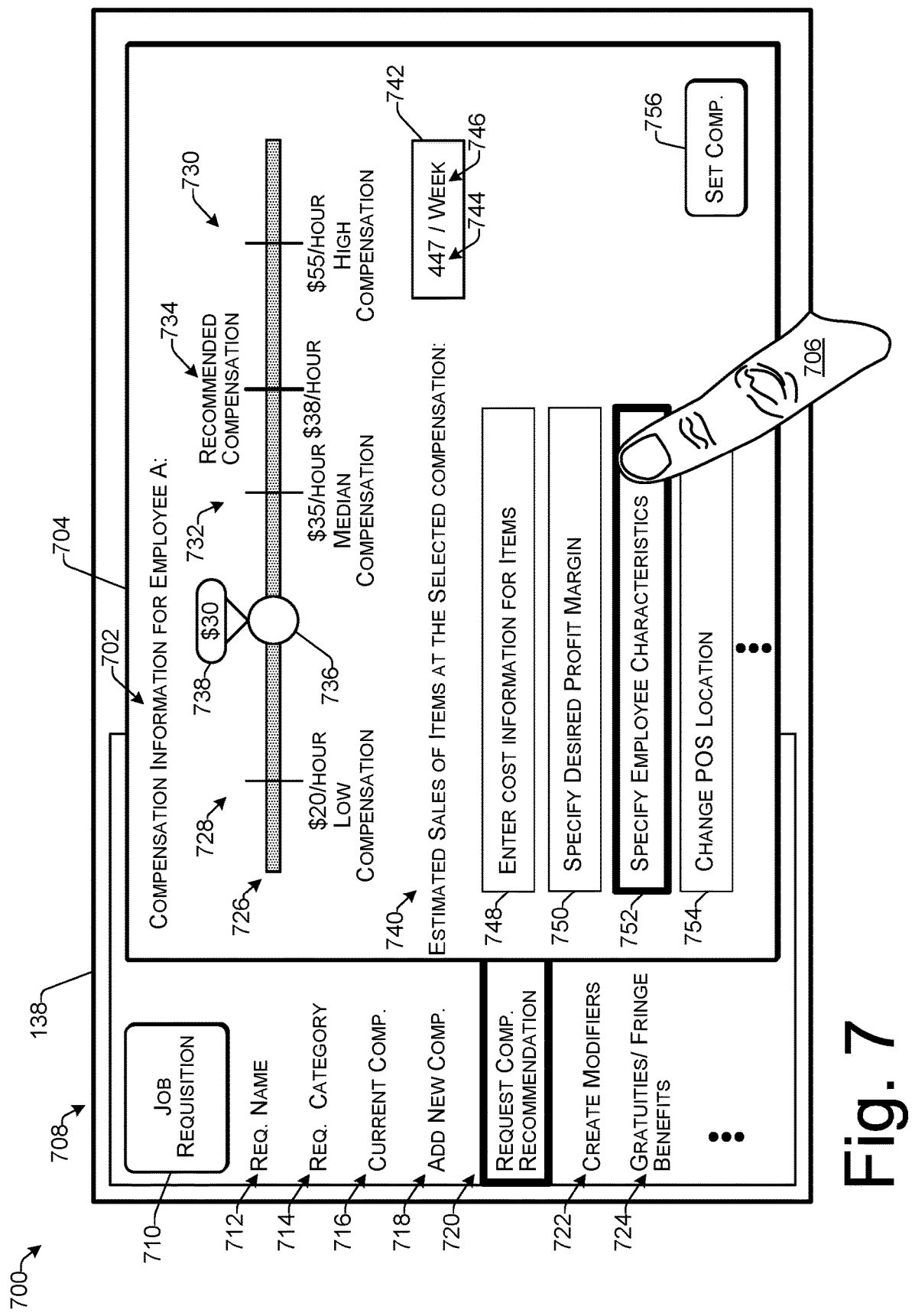
FIG. 7 illustrates an example interface for presenting compensation information to a merchant according to some implementations.

FIG. 7 illustrates an example graphical user interface (UI) 700 for presenting compensation information to a merchant according to some implementations. For example, compensation information 702 may be presented in a window 704 or other area of the display 118 associated with the merchant device 108 (not shown in FIG. 7). Alternatively, of course, the compensation information 702 may be presented to the merchant using any other suitable communication technology or presentation techniques, such as audio presentation, presentation at a designated area of the UI 700, presentation on a separate display, and so forth. In some examples, the UI 700 may be optimized to receive touch inputs from a finger or other input object 706.

In the example of FIG. 7, the compensation information 702 is shown as being presented in the window 704, such as a pop-up window, that may be closed by the merchant after viewing, or that may close automatically after the elapse of a predetermined period of time. Additionally, in other examples, the compensation information 702 may be presented in any other suitable type of window or other interface, or using any suitable type of graphic, overlaid text, or the like. For instance, the compensation information 702 may be presented over another interface or in its own designated area of an interface already presented, and may be presented by the merchant application, or by a separate application that is executable on the merchant device or on any other suitable computing device.

As one example, the window 704 may be presented as an overlay on a job requisition setup interface 708 provided by the merchant application. For example, the job requisition setup interface 708 may be used by the merchant for adding or updating job requisition information such as roles for particular employees that are currently employed, or that will be reviewed for compensation, by the merchant. In the illustrated example, the job requisition setup interface 708 may enable the merchant to add an job requisition 710 (or review a filled job requisition by an employee) that is representative of the particular role for which the merchant is setting up the job requisition information, and which is referred to as job requisition A in this example. The job requisition A may also be interchanged with employee A should the employee already be working at the merchant location filling the job requisition A. For example, at a later time, when the merchant is reviewing compensation or candidates, the job requisition 710 may be presented on the merchant device, along with a plurality of images of other employees applying to the job. The merchant may select a particular job requisition that is being applied to be a potential employee, such as by tapping on a corresponding image of the job requisition, or the like.

The job requisition setup interface 708 may further include a job requisition name 712, a job requisition category 714, a current compensation 716, an option 718 to add a new compensation 718 manually, an option 720 to request a compensation recommendation, an option 722 to create modifiers for the job requisition (e.g., optional choices for the job requisition, such as type of bread or toppings for a sandwich, etc.), and a gratuity/perks amount 724 to be added when the job requisition is finalized. Accordingly, the merchant may use the job requisition setup interface 708 to enter information about a job requisition that the merchant offers or intends to offer to employees. This step may be performed after a candidate is finalized and also when an employee is already employed and a review of compensation is performed as per trigger factors or even as part of an annual review.

In this example, suppose that during use of the job requisition setup interface 708, such as for adding job requisition A to the merchant's current offerings, or during adjustment of compensation for job requisition A if job requisition A is already supported by the merchant, the merchant selects the option 720 to request compensation recommendations to determine a dynamically adjusted compensation for job requisition A. Accordingly, the option 720 may be highlighted, as illustrated. Further, in response, to receiving the user input via the interface 708, the merchant device may send to the service computing device a request for compensation information, as discussed above with respect to FIG. 6. In response, the service computing device may send to the merchant device the requested compensation information, as also discussed above. The merchant device may receive the compensation information and the merchant application may present the compensation information in the window 704 such as overlaid on the job requisition setup interface 708.

The window 704 may include one or more graphic elements, and may be interactive for enabling the merchant to interact with the compensation information 702 for job requisition A. Accordingly, the window 704 may present a UI that includes a graphic element 726, which is illustrated as a slider scale in this example, but which may be any interactive control to enable the merchant to view various different compensation points for job requisition A. In this example, the compensation information 702 for job requisition A includes a low compensation 728, a high compensation 738, a median compensation 732, and a recommended compensation 734. For example, the low compensation 728 may be the lowest compensation offered by a similar merchant in the same geographic region as the current merchant. Similarly, the high compensation 730 may be the highest compensation offered by a similar merchant in the same geographic region as the current merchant. Furthermore, the median compensation 732 may be the median compensation among all similar merchants in the same geographic region as the first merchant (e.g., as determined from a subset of merchant profiles of merchants categorized in the same category as the current merchant and categorized in the same geographic region as the current merchant, as discussed above with respect to FIG. 6). In addition, the recommended compensation 734 may be the compensation for job requisition A that is recommended for the current merchant. In some examples, the recommended compensation 734 may be determined based upon one or more of the various factors discussed above with respect to FIG. 6, such as an expressed or implied business model of the current merchant, a specified profit margin, specified or desired employee characteristics, or the like.

In this example, the graphic element 726 further includes a virtual slider element 736 that the merchant may slide along the graphic element 726 to view various different compensation points. For instance, the different compensation may be presented above the slider element 736, as indicated at 738, at any other suitable location, or using any other suitable technique. In addition, the window 704 may include an indication 740 of projected sales volume of job requisition A at a selected compensation. For example, a box 742 may present a number of units 744 projected to be sold over a selected period of time 746 at a selected compensation point. Accordingly, as the merchant slides the slider element 736 along the slider scale of the graphic element 726, the predicted sales of job requisition A indicated at 744 may change to reflect the various predicted sales at the various different possible compensation points for the particular merchant. For example, as the merchant slides the slider element 736 toward the low compensation point, the predicted sales number 744 of job requisition A may increase based on calculations previously made by the service computing device, or based on calculations made in near real time by the service computing device. In some examples, the predicted sales number 744 may be calculated as discussed above with respect to FIG. 6. Accordingly, if the merchant is interested in selecting compensation points other than the recommended compensation 734, the merchant may be presented with estimates of how many units the merchant might be able to sell at other selected compensation points. Further, while sales volume over time is presented as a metric in this example, numerous other metrics tied to compensation changes may be presented in other examples, and may, in some cases, be presented based on expressed preferences of the particular merchant.

In the illustrated example, suppose that employee A is a barista and works on hourly wages. Thus, the presented compensation information for employee A shows that the lowest compensation at which the baristas at similar merchants in the current merchant's geographic region operate is $20/hour, while the highest compensation is $55/hour. Further, the median compensation is $35/hour. Further, suppose that the merchant has previously indicated, either expressly to the service provider, or implicitly through compensation of other employees offered by the merchant, that the merchant desires to operate a premium brand business model and charge premium compensation. Accordingly, the service provider may determine that $38/hour is the optimal recommended compensation for the merchant based on the number of projected sales per week, e.g., estimated at 395 sales per week (not shown in FIG. 7). However, suppose that the merchant is considering changing business models to a higher volume business model. Thus, the merchant may slide the slider element 736 along the slider scale to various different compensation points to see how many more units the merchant might be able to sell at the different compensation points. In this example, the merchant has moved the slider element to the $30/hour compensation point, and the estimated sales for job requisition A has changed accordingly to 447 units per week.

If the merchant decides to proceed with changing the current business model, or if the merchant otherwise desires to change one or more factors currently applied for determining the recommended compensation for the merchant, in some examples, the merchant may use one or more controls presented in the window 704 for accomplishing this. Thus, the UI 700 may include virtual controls 748-754 to enable the merchant to adjust various factors that are used for calculating the recommended compensation 734 for job requisition A. As several examples, the merchant may be able to select a virtual control 748 for entering cost information for job requisition A, which the service computing device may take into account when considering a recommended compensation 734. In addition, the merchant may be able to select a virtual control 750 to specify a desired profit margin for job requisition A, such as when the merchant desires that the recommended compensation 734 to take into account a specific profit margin per unit sold as part of job requisition A. In addition, the merchant may be able to select a virtual control 752 to specify employee characteristics, such as for compensation job requisition A to offer to a particular clientele or other employee category, which may be determined through one or more employee characteristics included in the employee profiles 128. In addition, the merchant may be able to select a virtual control 754 to change a POS location to determine if different compensation may be charged at a different location. For example, if the merchant has a mobile business such as in the case of a street vendor, food truck, or the like, the merchant may want to determine if there are better locations for conducting transactions. Further, other constraints and considerations will be apparent, with those illustrated herein merely being several examples for discussion purposes.

When the merchant has decided on a compensation for job requisition A, the merchant may select a virtual control 756 to set the selected compensation as the compensation for job requisition A. The selection of control 756 may result in the selected compensation being entered into the job requisition setup interface 708 as the new current compensation 716, and the window 704 may close. Subsequently, the merchant may complete the setup for job requisition A, and the selected compensation is added to the job requisition compensation information for use by the merchant application when conducting transactions with employees. Furthermore, the updated job requisition compensation information may be sent by the merchant application to the service computing device and its payroll service, as discussed above, and associated with the merchant profile of the particular merchant. Additionally, if the merchant has multiple merchant devices, the updated job requisition compensation information may be sent by the service computing device to the other merchant devices associated with the merchant profile of the particular merchant. As another alternative, the merchant devices of the merchant may be able to communicate job requisition compensation information to each other directly.

In addition, as another example, the merchant may be able to view a plurality of the graphic elements 726 concurrently for a respective plurality of employees offered by the merchant. For example, the multiple graphic elements 726 may be vertically aligned along the median (or average) compensation points 732 so that the merchant may view which employees are remunerated above the median compensation point 732, which employees are remunerated below the median compensation point 732, and so forth. The merchant may adjust any of the compensation, such as using the respective slider element 736 for a respective job requisition, and upon completion, the compensation adjustments may be automatically entered by the merchant application for use when conducting transactions.

Additionally, while several examples of interfaces for presenting compensation information have been described above, the compensation information may alternatively be presented in any other suitable manner using any suitable interfaces, with the foregoing being merely several examples provided for descriptive purposes. Numerous other variations will be apparent to those of skill in the art having the benefit of the disclosure herein.

Figure 8:
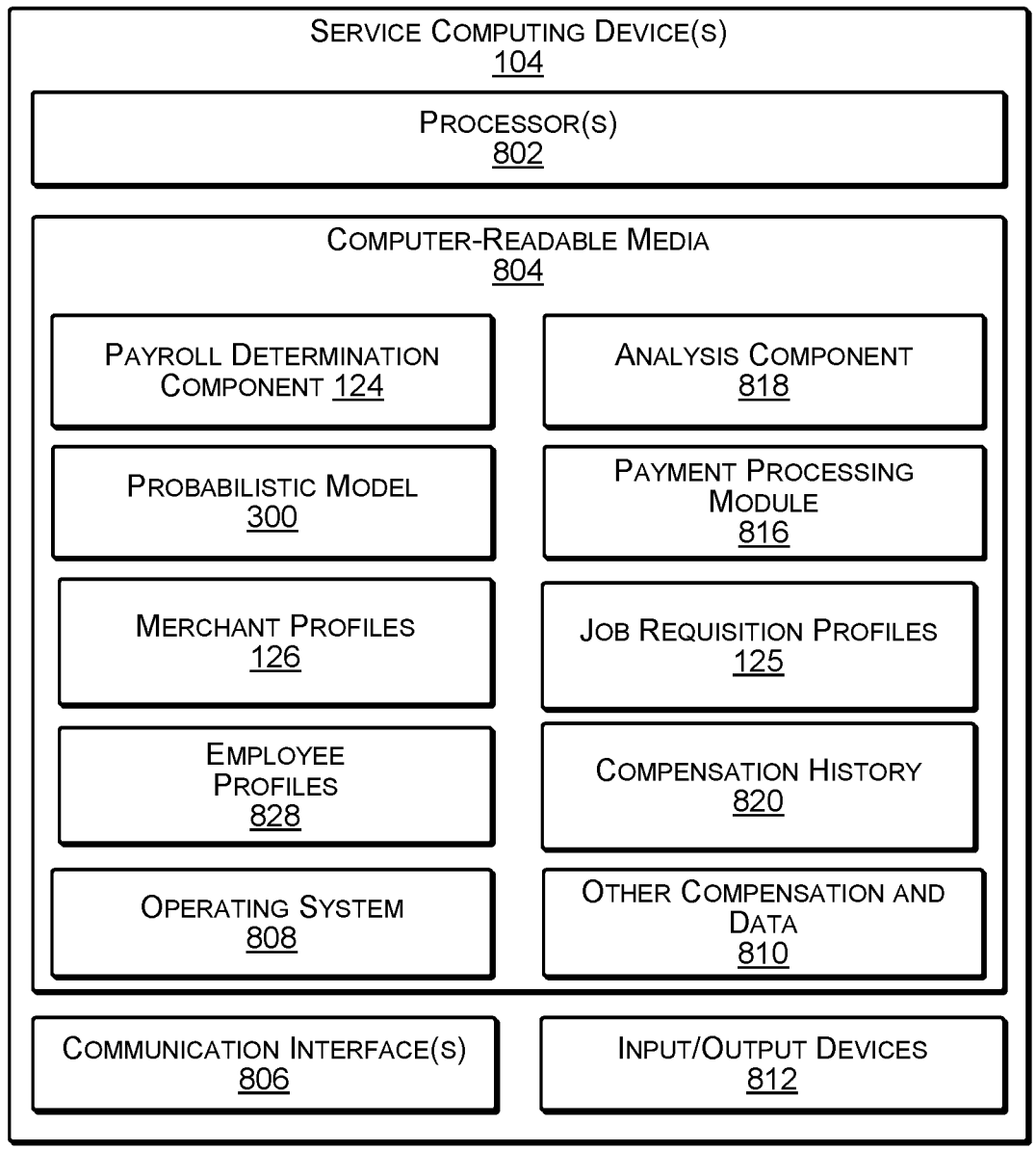
FIG. 8 illustrates select components of an example service computing device according to some implementations.

FIG. 8 illustrates select components of the service computing device 104 that may be used to implement some functionality of the payment and compensation information service described herein. The service computing device 102 may be operated by a service provider that provides the payment service and the compensation information service, and may include one or more servers or other types of computing devices that may be embodied in any number of ways. For instance, in the case of a server, the components, other functional components, and data may be implemented on a single server, a cluster of servers, a server farm or data center, a cloud-hosted computing service, a cloud-hosted storage service, and so forth, although other computer architectures may additionally or alternatively be used.

Further, while the figures illustrate the components and data of the service computing device 104 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 104 may be located together or separately, and organized, for example, as virtual servers, server banks and/or server farms. The described functionality may be provided by the servers of a single entity or enterprise, or may be provided by the servers and/or services of multiple different employees or enterprises.

In the illustrated example, each service computing device 102 may include one or more processors 802, one or more computer-readable media 804, and one or more communication interfaces 806. Each processor 802 may be a single processing unit or a number of processing units, and may include single or multiple computing units or multiple processing cores. The processor(s) 802 can be implemented as one or more microprocessors, microcomputers, microcontrollers, digital signal processors, central processing units, state machines, logic circuitries, and/or any devices that manipulate signals based on operational instructions. For instance, the processor(s) 802 may be one or more hardware processors and/or logic circuits of any suitable type specifically programmed or configured to execute the algorithms and processes described herein. The processor(s) 802 can be configured to fetch and execute computer-readable instructions stored in the computer-readable media 804, which can program the processor(s) 802 to perform the functions described herein.

The computer-readable media 804 may include volatile and nonvolatile memory and/or removable and non-removable media implemented in any type of technology for storage of information, such as computer-readable instructions, data structures, program components, or other data. Such computer-readable media 804 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 104, the computer-readable media 804 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 804 may be used to store any number of functional components that are executable by the processors 802. In many implementations, these functional components comprise instructions or programs that are executable by the processors 802 and that, when executed, specifically configure the one or more processors 802 to perform the actions attributed above to the service computing device 104. Functional components stored in the computer-readable media 804 may include the payroll determination component 124, the analysis component 818, and the payment processing component 816. Additional functional components stored in the computer-readable media 804 may include an operating system 804 for controlling and managing various functions of the service computing device 104.

In addition, the computer-readable media 804 may store data used for performing the operations described herein. Thus, the computer-readable media may store the merchant information, including the merchant profiles 126, and the employee information, including the employee profiles 128. In addition, at least a portion of the probabilistic model 300 may be stored on the computer-readable media and/or the service computing device 104 may access or generate the probabilistic model 300. The service computing device 104 may also include or maintain other functional components and data, such as other components and data 810, which may include programs, drivers, etc., and the data used or generated by the functional components. Further, the service computing device 104 may include many other logical, programmatic and physical components, of which those described above are merely examples that are related to the discussion herein.

The communication interface(s) 806 may include one or more interfaces and hardware components for enabling communication with various other devices, such as over the network(s) 106. For example, communication interface(s) 806 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The service computing device 102 may further be equipped with various input/output (I/O) devices 812. Such I/O devices 812 may include a display, various user interface controls (e.g., buttons, joystick, keyboard, mouse, touch screen, etc.), audio speakers, connection ports and so forth.

Figure 9:
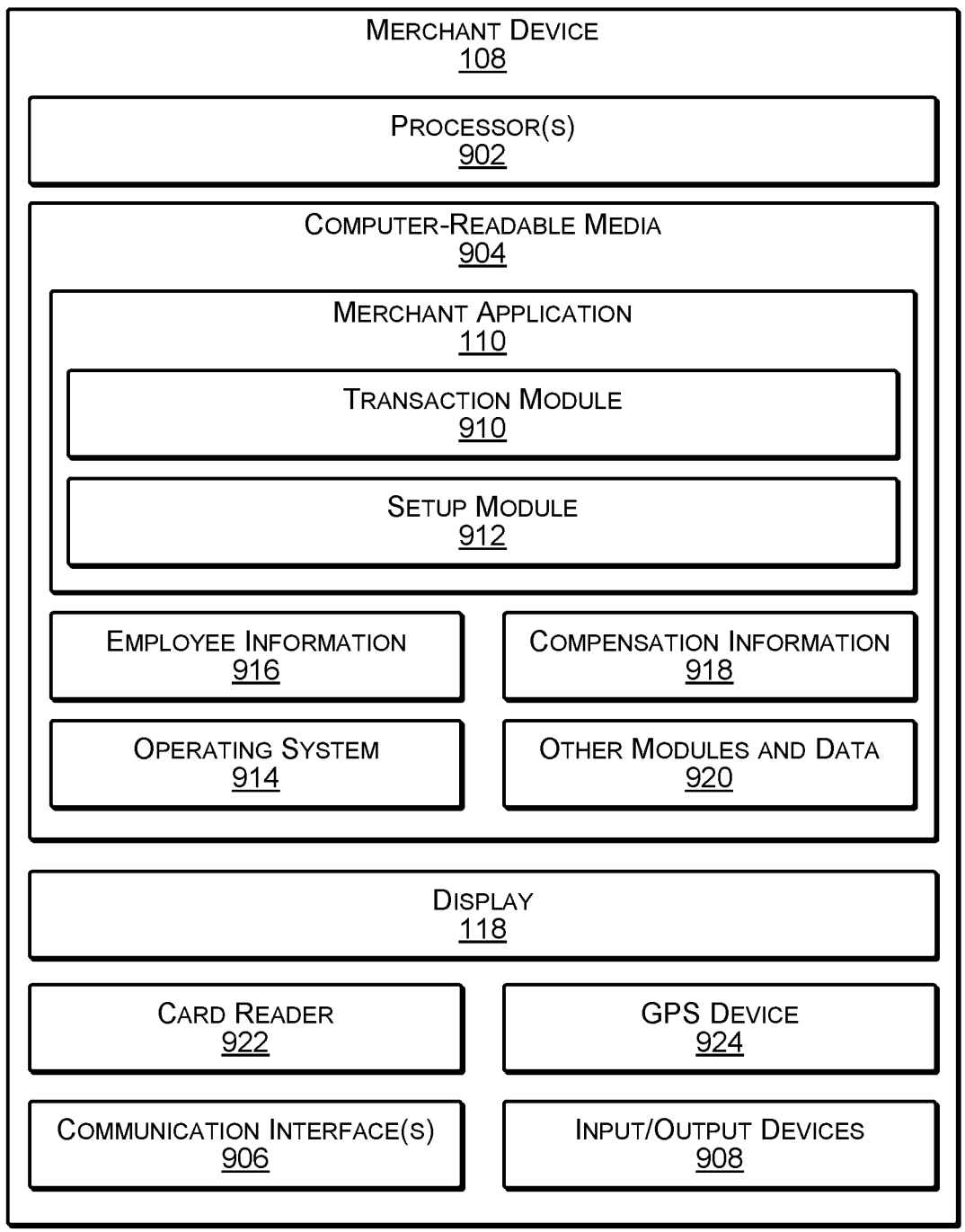
FIG. 9 illustrates select components of an example employer computing device according to some implementations.

FIG. 9 illustrates select example components of an example merchant device 108 according to some implementations. The merchant device 108 may be any suitable type of computing device, e.g., portable, semi-portable, semi-stationary, or stationary. Some examples of the merchant device 108 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the merchant device 108 includes at least one processor 902, one or more computer-readable media 904, one or more communication interfaces 906, and one or more input/output (I/O) devices 908. Each processor 902 may itself comprise one or more processors or processing cores. For example, the processor 902 can be implemented as one or more microprocessors, microcomputers, microcontrollers, digital signal processors, central processing units, state machines, logic circuitries, and/or any devices that manipulate signals based on operational instructions. In some cases, the processor 902 may be one or more hardware processors and/or logic circuits of any suitable type specifically programmed or configured to execute the algorithms and processes described herein. The processor 902 can be configured to fetch and execute computer-readable processor-executable instructions stored in the computer-readable media 904.

Depending on the configuration of the merchant device 108, the computer-readable media 904 may be an example of tangible non-transitory computer storage media and may include volatile and nonvolatile memory and/or removable and non-removable media implemented in any type of technology for storage of information such as computer-readable processor-executable instructions, data structures, program components or other data. The computer-readable media 904 may include, but is not limited to, RAM, ROM, EEPROM, flash memory, solid-state storage, magnetic disk storage, optical storage, and/or other computer-readable media technology. Further, in some cases, the merchant device 108 may access external storage, such as RAID storage systems, storage arrays, network attached storage, storage area networks, cloud storage, or any other medium that can be used to store information and that can be accessed by the processor 902 directly or through another computing device or network. Accordingly, the computer-readable media 904 may be computer storage media able to store instructions, components or components that may be executed by the processor 902. Further, when mentioned, non-transitory computer-readable media exclude media such as energy, carrier signals, electromagnetic waves, and signals per se.

The computer-readable media 904 may be used to store and maintain any number of functional components that are executable by the processor 902. In some implementations, these functional components comprise instructions or programs that are executable by the processor 902 and that, when executed, implement operational logic for performing the actions and services attributed above to the merchant device 108. Functional components of the merchant device 108 stored in the computer-readable media 904 may include the merchant application 116. In this example, the merchant application 116 includes a transaction component 910 and a setup component 912. For example, the transaction component 910 may present an interface, such as a payment interface, as discussed above, to enable the merchant to conduct transactions, receive payments, and so forth, as well as for communicating with the service computing device 102 for processing payments and sending transaction information. Further, the setup component 912 may present a setup interface to enable the merchant to setup employees, such as for adding new employees or modifying information, such as compensation information 918, for existing employees, information of who is stored in 916. The setup component 912 may further enable the merchant to manage the merchant's account, the merchant profile, merchant preferences, view saved or new compensation information, and the like. Additional functional components may include an operating system 914 for controlling and managing various functions of the merchant device 108 and for enabling basic user interactions with the merchant device 108.

In addition, the computer-readable media 904 may also store data, data structures and the like, that are used by the functional components. For example, data stored by the computer-readable media 904 may include job requisition information 1816 that includes information about the employees employed by the merchant, which may include a list of employees currently available from the merchant, images of the employees, descriptions of the employees, compensation of the employees (e.g., the job requisition compensation information 130—not shown in FIG. 12), and so forth. Furthermore, the computer readable media may have stored thereon compensation information 918 that has been received from the service provider for one or more employees and stored at least temporarily, or the like. Depending on the type of the merchant device 108, the computer-readable media 904 may also optionally include other functional components and data, such as other components and data 920, which may include programs, drivers, etc., and the data used or generated by the functional components. Further, the merchant device 108 may include many other logical, programmatic and physical components, of which those described are merely examples that are related to the discussion herein.

The communication interface(s) 906 may include one or more interfaces and hardware components for enabling communication with various other devices, such as over the network(s) 106 or directly. For example, communication interface(s) 906 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 9 further illustrates that the merchant device 108 may include the display 118 mentioned above. Depending on the type of computing device used as the merchant device 108, the display 118 may employ any suitable display technology. For example, the display 118 may be a liquid crystal display, a plasma display, a light emitting diode display, an OLED (organic light-emitting diode) display, an electronic paper display, or any other suitable type of display able to present digital content thereon. In some examples, the display 118 may have a touch sensor associated with the display 118 to provide a touchscreen display configured to receive touch inputs for enabling interaction with a graphic interface presented on the display 118. Accordingly, implementations herein are not limited to any particular display technology. Alternatively, in some examples, the merchant device 108 may not include the display 118, and information may be presented by other means, such as aurally.

The merchant device 108 may further include the one or more I/O devices 908. The I/O devices 908 may include speakers, a microphone, a camera, and various user controls (e.g., buttons, a joystick, a keyboard, a keypad, etc.), a haptic output device, and so forth.

In addition, the merchant device 108 may include or may be connectable to a card reader 922. In some examples, the card reader may plug in to a port in the merchant device, such as a microphone/headphone port, a data port, or other suitable port. The card reader may include a read head for reading a magnetic strip of a merchant device, and further may include encryption technology for encrypting the information read from the magnetic strip. Alternatively, numerous other types of card readers may be employed with the merchant devices 108 herein, depending on the type and configuration of the merchant device 108.

Other components included in the merchant device 108 may include various types of sensors, which may include a GPS device 924 able to indicate location information, as well as other sensors (not shown) such as an accelerometer, gyroscope, compass, proximity sensor, and the like. Additionally, the merchant device 108 may include various other components that are not shown, examples of which include removable storage, a power source, such as a battery and power control unit, and so forth.

Figure 10:
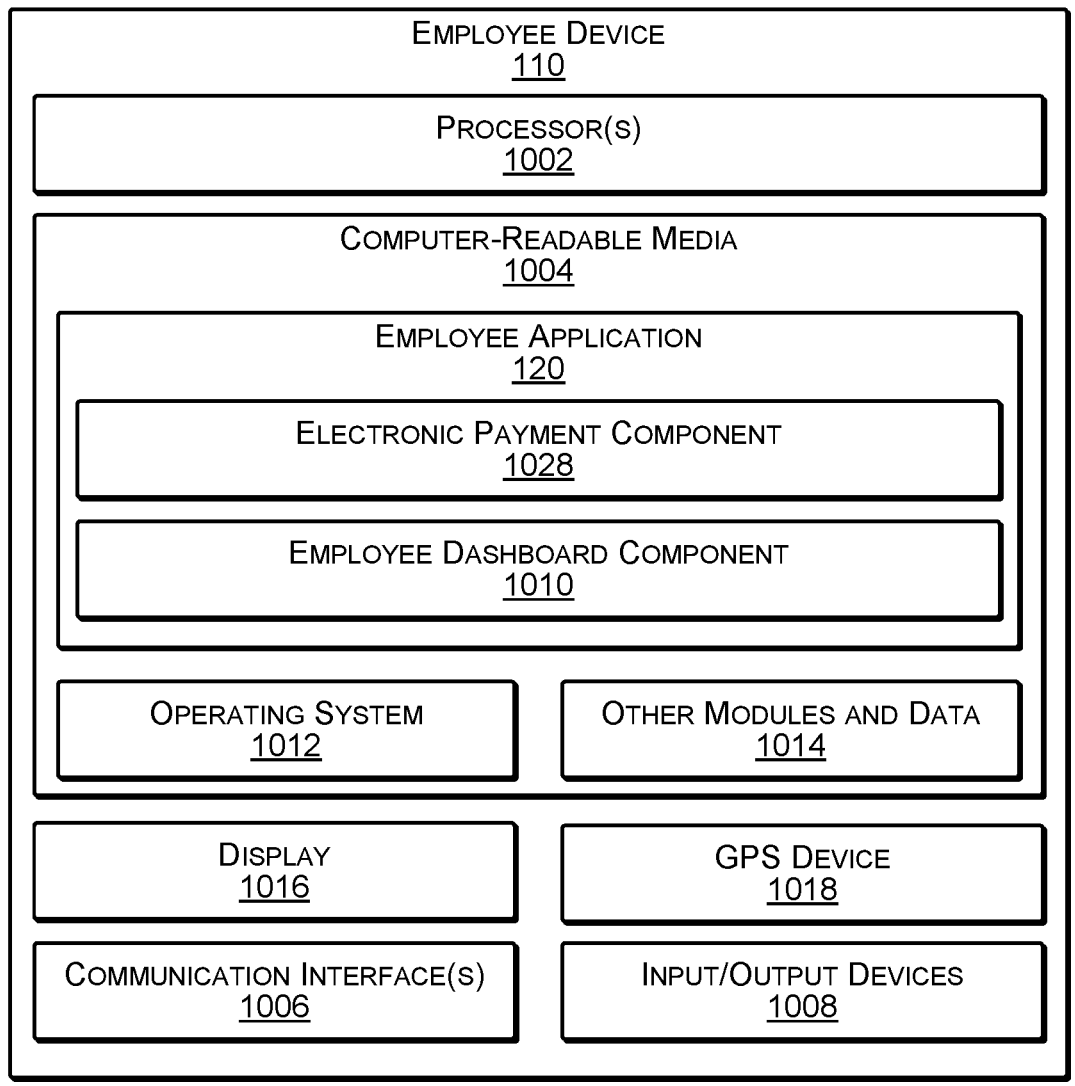
FIG. 10 illustrates select components of an example employee computing device according to some implementations.

FIG. 10 illustrates select example components of the employee device 110 that may implement the functionality described above according to some examples. The employee device 110 may be any of a number of different types of portable computing devices. Some examples of the employee device 110 may include smart phones and mobile communication devices; tablet computing devices; laptops, netbooks and other portable computers; wearable computing devices and/or body-mounted computing devices, which may include watches and augmented reality devices, such as helmets, goggles or glasses; and any other portable device capable of sending communications and performing the functions according to the techniques described herein.

In the example of FIG. 10, the employee device 110 includes components such as at least one processor 1002, one or more computer-readable media 1004, the one or more communication interfaces 1006, and one or more input/output (I/O) devices 1014. Each processor 1002 may itself comprise one or more processors or processing cores. For example, the processor 1002 can be implemented as one or more microprocessors, microcomputers, microcontrollers, digital signal processors, central processing units, state machines, logic circuitries, and/or any devices that manipulate signals based on operational instructions. In some cases, the processor 1002 may be one or more hardware processors and/or logic circuits of any suitable type specifically programmed or configured to execute the algorithms and processes described herein. The processor 1002 can be configured to fetch and execute computer-readable processor-executable instructions stored in the computer-readable media 1004.

Depending on the configuration of the employee device 110, the computer-readable media 1004 may be an example of tangible non-transitory computer storage media and may include volatile and nonvolatile memory and/or removable and non-removable media implemented in any type of technology for storage of information such as computer-readable processor-executable instructions, data structures, program components or other data. The computer-readable media 1004 may include, but is not limited to, RAM, ROM, EEPROM, flash memory, solid-state storage, magnetic disk storage, optical storage, and/or other computer-readable media technology. Further, in some cases, the employee device 110 may access external storage, such as RAID storage systems, storage arrays, network attached storage, storage area networks, cloud storage, or any other medium that can be used to store information and that can be accessed by the processor 1002 directly or through another computing device or network. Accordingly, the computer-readable media 1004 may be computer storage media able to store instructions, components or components that may be executed by the processor 1002. Further, when mentioned, non-transitory computer-readable media exclude media such as energy, carrier signals, electromagnetic waves, and signals per se.

The computer-readable media 1004 may be used to store and maintain any number of functional components that are executable by the processor 1002. In some implementations, these functional components comprise instructions or programs that are executable by the processor 1002 and that, when executed, implement operational logic for performing the actions and services attributed above to the employee device 110. Functional components of the employee device 110 stored in the computer-readable media 1004 may include the employee application 118, as discussed above. In this example, the employee application 118 includes the electronic payment component 1028, as discussed above, and an employee dashboard component 1010. For example, the employee dashboard component 1010 may present the employee with an interface for managing the employee's account, changing information, changing preferences, and so forth. Additional functional components may include an operating system 1012 for controlling and managing various functions of the employee device 110 and for enabling basic user interactions with the employee device 110.

In addition, the computer-readable media 1004 may also store data, data structures and the like, that are used by the functional components. Depending on the type of the employee device 110, the computer-readable media 1004 may also optionally include other functional components and data, such as other components and data 1006, which may include applications, programs, drivers, etc., and the data used or generated by the functional components. Further, the employee device 110 may include many other logical, programmatic and physical components, of which those described are merely examples that are related to the discussion herein.

The communication interface(s) 1006 may include one or more interfaces and hardware components for enabling communication with various other devices, such as over the network(s) 106 or directly. For example, communication interface(s) 1006 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 10 further illustrates that the employee device 110 may include a display 1016. Depending on the type of computing device used as the employee device 110, the display may employ any suitable display technology. For example, the display 1016 may be a liquid crystal display, a plasma display, a light emitting diode display, an OLED (organic light-emitting diode) display, an electronic paper display, or any other suitable type of display able to present digital content thereon. In some examples, the display 1016 may have a touch sensor associated with the display 1016 to provide a touchscreen display configured to receive touch inputs for enabling interaction with a graphic interface presented on the display 1016. Accordingly, implementations herein are not limited to any particular display technology. Alternatively, in some examples, the employee device 110 may not include a display.

The employee device 110 may further include the one or more I/O devices 1008. The I/O devices 1008 may include speakers, a microphone, a camera, and various user controls (e.g., buttons, a joystick, a keyboard, a keypad, etc.), a haptic output device, and so forth.

Other components included in the employee device 110 may include various types of sensors, which may include a GPS device 1018 able to indicate location information, as well as other sensors (not shown) such as an accelerometer, gyroscope, compass, proximity sensor, and the like. Additionally, the employee device 110 may include various other components that are not shown, examples of which include removable storage, a power source, such as a battery and power control unit, and so forth.

Various instructions, methods and techniques described herein may be considered in the general context of computer-executable instructions, such as program components stored on computer-readable media, and executed by the processor(s) herein. Generally, program components include routines, programs, objects, components, data structures, etc., for performing particular tasks or implementing particular abstract data types. These program components, and the like, may be executed as native code or may be downloaded and executed, such as in a virtual machine or other just-in-time compilation execution environment. Typically, the functionality of the program components may be combined or distributed as desired in various implementations. An implementation of these components and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
receiving, by a service computing device associated with a payment service and from a plurality of merchant devices associated with a plurality of respective merchant profiles, point-of-sale (POS) transaction information associated with a plurality of POS transactions, wherein the plurality of merchant devices are associated with respective instances of a POS application that configures each of the plurality of merchant devices as a POS terminal for generating the POS transaction information and transmitting the POS transaction information to the service computing device;
receiving, by the service computing device and from a particular merchant device of the plurality of merchant devices and associated with a particular merchant profile, an indication of a particular job requisition;
determining, by the service computing device, recommended compensation information for the particular job requisition based at least in part on a portion of the POS transaction information associated with one or more other merchant profiles of the plurality of respective merchant profiles that are associated with one or more merchants different from the particular merchant profile;
generating one or more probabilistic models trained utilizing the portion of the POS transaction information associated with the one or more merchants that are different from the particular merchant profile, the one or more probabilistic models including a weighted graph indicating probabilities that particular transactions are associated with particular employee profiles;
determining, by the service computing device and utilizing the one or more probabilistic models, a performance value associated with one or more other job requisitions of the one or more other merchant profiles;
adjusting, by the service computing device, the recommended compensation information based at least in part on the performance value; and
transmitting, from the service computing device and to the merchant device, the recommended compensation information for the particular job requisition for presentation via a user interface of the merchant device.

2. The method as recited in claim 1, further comprising:
associating at least one of job requisition compensation information or the POS transaction information with one or more respective merchant profiles corresponding to respective merchant devices from which the at least one of the job requisition compensation information or the POS transaction information was received;
determining a subset of the one or more other merchant profiles, wherein the merchant profiles in the subset of the one or more other merchant profiles are similar to the particular merchant profile with respect to types of employees offered or a location at which one or more employees are offered compensation; and
wherein determining the recommended compensation information for the particular job requisition comprises determining the recommended compensation information for the particular job requisition from at least one of the portion of the job requisition compensation information or the portion of the POS transaction information associated with the subset of the one or more other merchant profiles.

3. The method as recited in claim 2, wherein the determining the subset of the one or more other merchant profiles further comprises:
associating individual merchant profiles of the plurality of the respective merchant profiles and the particular merchant profile with at least one merchant category of a plurality of different merchant categories, wherein the different merchant categories are based at least in part on the types of employees offered through the respective merchant devices corresponding to the respective merchant profiles; and determining the subset of the one or more other merchant profiles based at least in part on the merchant profiles in the subset of the one or more other merchant profiles being associated with a same merchant category as the particular merchant profile.

4. The method as recited in claim 2, further comprising:
associating individual merchant profiles of the plurality of the respective merchant profiles and the particular merchant profile with at least one location category, wherein different location categories indicate at least one of different geographic regions, different portions of geographic regions, or different defined physical areas; and determining the subset of the one or more other merchant profiles based at least in part on the merchant profiles in the subset of the one or more other merchant profiles being associated with a same location category as the particular merchant profile.

5. The method as recited in claim 1, wherein the determining the recommended compensation information for the particular job requisition further comprises determining at least one of:
a highest compensation at which the particular job requisition is offered;
a lowest compensation at which the particular job requisition is offered;
a median compensation at which the particular job requisition is offered; or
an average compensation at which the particular job requisition is offered.

6. The method as recited in claim 1, wherein the determining the recommended compensation information for the particular job requisition further comprises determining the recommended compensation information based at least in part on at least one of:
a cost of the particular job requisition associated with a particular employee profile; or
a specified profit margin associated with the particular employee profile.

7. The method as recited in claim 1, further comprising:
associating the POS transaction information with a plurality of respective employee profiles, wherein individual employee profiles include respective employee information and information regarding at least one POS transaction associated with the respective employee information;
determining a subset of employee profiles of the plurality of respective employee profiles that include information regarding one or more POS transactions of the plurality of POS transactions for acquiring the particular job requisition; and
wherein determining the recommended compensation information comprises determining the recommended compensation information, at least in part, from the information regarding the one or more POS transactions of the plurality of POS transactions for acquiring the particular job requisition included in the subset of the employee profiles.

8. The method as recited in claim 7, further comprising determining the subset of the employee profiles based on at least one common characteristic, wherein the at least one common characteristic is determined based on at least one of: employee residence information; employee age; employee sex; employee affluence; employee ethnicity; employee language; employee education; employee marital status; employee occupation; employee religion; employee political affiliation; or employee association membership.

9. The method as recited in claim 7, further comprising associating the POS transaction information with the individual employee profiles based at least in part on determining that employee information included with the POS transaction information matches the respective employee information in the individual employee profiles with a level of confidence that exceeds a threshold level of confidence.

10. The method as recited in claim 1, wherein the recommended compensation information is presented on the user interface of the merchant device concurrently with at least one interactive graphic element.

11. The method as recited in claim 1, wherein receiving the indication of the particular job requisition comprises:
causing the merchant device to present a job requisition setup interface on a display of the merchant device, wherein the job requisition setup interface is configured to receive entry of job requisition information related to a job requisition.

12. The method as recited in claim 1, further comprising:
receiving, from the merchant device, an indication of a selection of a compensation currently presented on the merchant device; and
generating, based at least in part on the indication of the selection, updated compensation information for the particular job requisition.

13. The method as recited in claim 1, wherein the recommended compensation information for the particular job requisition is associated with the particular merchant profile, and wherein the recommended compensation information is based on one or more factors comprising at least one of:
a cost of the particular job requisition associated with the particular merchant profile;
a specified profit margin associated with the particular merchant profile;
at least one specified employee characteristic associated with the particular merchant profile; or
an expressed or implied business model associated with the particular merchant profile.

14. A system comprising:
one or more processors; and
one or more computer-readable media storing instructions executable by the one or more processors, wherein the instructions program the one or more processors to:
receive, by a service computing device associated with a payment service and from a plurality of merchant devices associated with a plurality of respective merchant profiles, point-of-sale (POS) transaction information associated with a plurality of POS transactions, wherein the plurality of merchant devices are associated with respective instances of a POS application that configures each of the plurality of merchant devices as a POS terminal for generating the POS transaction information and transmitting the POS transaction information to the service computing device;
receive, by the service computing device and from a particular merchant device of the plurality of merchant devices and associated with a particular merchant profile, an indication of a particular job requisition;
determine, by the service computing device, recommended compensation information for the particular job requisition based at least in part on a portion of the POS transaction information associated with one or more other merchant profiles of the plurality of respective merchant profiles that are associated with one or more merchants different from the particular merchant profile;
generate one or more probabilistic models trained utilizing the portion of the POS transaction information associated with the one or more merchants that are different from the particular merchant profile, the one or more probabilistic models including a weighted graph indicating probabilities that particular transactions are associated with particular employee profiles;
determine, by the service computing device and based at least in part on the one or more probabilistic models, a performance value associated with one or more other job requisitions of the one or more other merchant profiles;
dynamically adjust, by the service computing device, the recommended compensation information based at least in part on the performance value; and
transmit, from the service computing device and to the merchant device, the recommended compensation information for the particular job requisition for presentation via a user interface of the merchant device.

15. The system as recited in claim 14, wherein the instructions further program the one or more processors to:
associate at least one of job requisition compensation information or the POS transaction information with one or more respective merchant profiles corresponding to respective merchant devices from which the at least one of the job requisition compensation information or the POS transaction information was received;
determine a subset of the one or more other merchant profiles, wherein merchant profiles in the subset of the one or more other merchant profiles are similar to the particular merchant profile with respect to types of employees offered or a location at which an employee is offered compensation; and
determine the recommended compensation information for the particular job requisition from at least one of the portion of the job requisition compensation information or the portion of the POS transaction information associated with the subset of the one or more other merchant profiles.

16. The system as recited in claim 15, wherein the instructions further program the one or more processors to:
associate individual merchant profiles of the plurality of the respective merchant profiles and the particular merchant profile with at least one merchant category of a plurality of different merchant categories, wherein the plurality of different merchant categories are based at least in part on the types of employees offered through the respective merchant devices corresponding to the one or more respective merchant profiles; and
determine the subset of the one or more other merchant profiles based at least in part on the merchant profiles in the subset of the one or more other merchant profiles being associated with a same merchant category as the particular merchant profile.

17. The system as recited in claim 15, wherein the instructions further program the one or more processors to:
associate individual merchant profiles of the plurality of the respective merchant profiles and the particular merchant profile with at least one location category of a plurality of different location categories, wherein the plurality of different location categories indicate at least one of different geographic regions, different portions of geographic regions, or different defined physical areas; and
determine the subset of the one or more other merchant profiles based at least in part on the merchant profiles in the subset of the one or more other merchant profiles being associated with a same location category as the particular merchant profile.

18. The system as recited in claim 14, wherein the instructions further program the one or more processors to:
determine the recommended compensation information for the particular job requisition based on at least one of:
a highest compensation at which the particular job requisition is offered;
a lowest compensation at which the particular job requisition is offered;
a median compensation at which the particular job requisition is offered; or
an average compensation at which the particular job requisition is offered.

19. The system as recited in claim 14, wherein the instructions further program the one or more processors to determine the recommended compensation information based at least in part on at least one of:
a cost of the particular job requisition associated with a particular employee profile; or
a specified profit margin associated with the particular employee profile.

20. The system as recited in claim 14, wherein the recommended compensation information is presented on the user interface of the merchant device concurrently with at least one interactive graphic element.

21. One or more non-transitory computer-readable media maintaining instructions that, when executed by one or more processors, cause the one or more processors to perform acts comprising:
receiving, by a service computing device associated with a payment service and from a plurality of merchant devices associated with a plurality of respective merchant profiles, point-of-sale (POS) transaction information associated with a plurality of POS transactions, wherein the plurality of merchant devices are associated with respective instances of a POS application that configures each of the plurality of merchant devices as a POS terminal for generating the POS transaction information and transmitting the POS transaction information to the service computing device;
receiving, by the service computing device and from a particular merchant device of the plurality of merchant devices and associated with a particular merchant profile, an indication of a particular job requisition;
determining, by the service computing device, recommended compensation information for the particular job requisition, based at least in part on a portion of the POS transaction information associated with one or more other merchant profiles of the plurality of respective merchant profiles that are associated with one or more merchants different from the particular merchant profile;
generating one or more probabilistic models trained utilizing the portion of the POS transaction information associated with the one or more merchants that are different from the particular merchant profile, the one or more probabilistic models including a weighted graph indicating probabilities that particular transactions are associated with particular employee profiles;

determining, by the service computing device and based at least in part on the one or more probabilistic models, a performance value associated with one or more other job requisitions of the one or more other merchant profiles;

dynamically adjusting, by the service computing device, the recommended compensation information based at least in part on the performance value; and transmitting, from the service computing device and to the merchant device, the recommended compensation information for the particular job requisition for presentation via a user interface of the merchant device.

22. The one or more non-transitory computer readable media as recited in claim 21, the acts further comprising:

associating the POS transaction information with a plurality of respective employee profiles, wherein individual employee profiles include respective employee information and information regarding at least one POS transaction associated with the respective employee information;

determining a subset of the plurality of respective employee profiles that include information regarding one or more POS transactions of the plurality of POS transactions for acquiring the particular job requisition; and determining the recommended compensation information, at least in part, from the information regarding the one or more POS transactions of the plurality of POS transactions for acquiring the particular job requisition that is included in the subset of the plurality of respective employee profiles.

23. The one or more non-transitory computer readable media as recited in claim 22, the acts further comprising:

associating the POS transaction information with the plurality of respective employee profiles based at least in part on determining that employee information included with the POS transaction information matches the respective employee information in the individual employee profiles with a level of confidence that exceeds a threshold level of confidence.

24. The one or more non-transitory computer readable media as recited in claim 22, the acts further comprising:

determining the subset of the plurality of respective employee profiles based on at least one common characteristic, wherein the at least one common characteristic is determined based on at least one of: employee residence information; employee age; employee sex; employee affluence;

employee ethnicity; employee language; employee education; employee marital status; employee occupation; employee religion; employee political affiliation; or employee association membership.

25. A method performed by one or more computing devices associated with a payment service and configured to communicate over one or more networks with a plurality of merchant devices, the method comprising:

receiving, from the plurality of merchant devices and via an instance of a point-of-sale (POS) application, POS transaction information associated with a plurality of POS transactions, wherein the instance of the POS application configures individual merchant devices the plurality of merchant devices as a POS terminal for generating the POS transaction information and transmitting the POS transaction information to the one or more computing devices;

receiving, from a particular merchant device of the plurality of merchant devices and associated with a merchant, an indication of a particular job requisition;

determining recommended compensation information for the particular job requisition based at least in part on a portion of the POS transaction information associated with one or more other merchants different from the merchant;

generating one or more probabilistic models trained utilizing the portion of the POS transaction information associated with the one or more other merchants, the one or more probabilistic models including a weighted graph indicating probabilities that particular transactions are associated with particular employee profiles;

determining, based at least in part on the one or more probabilistic models, a performance value associated with one or more other job requisitions of the one or more other merchants;

dynamically adjusting the recommended compensation information based at least in part on the performance value;

transmitting, to the merchant device, the recommended compensation information for the particular job requisition;

determining an occurrence of one or more trigger factors;

generating, based at least in part on the occurrence of the one or more trigger factors, updated compensation information for the particular job requisition; and causing the updated compensation information to be presented via a user interface of the merchant device.

26. The method as recited in claim 25, wherein the recommended compensation information is presented on the user interface of the merchant device concurrently with at least one interactive graphic element.

27. The method as recited in claim 25, wherein receiving the indication of the particular job requisition comprises:

causing the merchant device to present a job requisition setup interface on a display of the merchant device, wherein the job requisition setup interface is configured to receive entry of job requisition information related to a job requisition; and wherein the occurrence of the one or more trigger factors comprises receiving, from the merchant device, an indication of an input of the particular job requisition to the job requisition setup interface.

28. The method as recited in claim 25, wherein the recommended compensation information for the particular job requisition is associated with a particular merchant profile, and wherein the recommended compensation information is based on one or more factors comprising at least one of:

a cost of the particular job requisition associated with the particular merchant profile;

a specified profit margin associated with the particular merchant profile;

at least one specified employee characteristic associated with the particular merchant profile; or an expressed or implied business model associated with the particular merchant profile.

29. The method as recited in claim 25, further comprising:

associating the POS transaction information with a plurality of respective employee profiles, wherein individual employee profiles include respective employee information and information regarding at least one POS transaction associated with the respective employee information;

determining a subset of employee profiles of the plurality of respective employee profiles that include information regarding one or more POS transactions of the plurality of POS transactions for acquiring the particular job requisition; and wherein determining the recommended compensation information comprises determining the recommended compensation information, at least in part, from the information regarding the one or more POS transactions of the plurality of POS transactions for acquiring the particular job requisition included in the subset of the employee profiles.

\* \* \* \* \*